(12) United States Patent
Bulanova et al.

(10) Patent No.: US 12,554,916 B2
(45) Date of Patent: Feb. 17, 2026

(54) METHOD TO AVOID MEMORY BANK CONFLICTS AND PIPELINE CONFLICTS IN TENSOR MEMORY LAYOUT

(71) Applicant: HUAWEI TECHNOLOGIES CO., LTD., Guangdong (CN)

(72) Inventors: Anna Bulanova, Markham (CA); Jessica Davies, Markham (CA); Xiong Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 718 days.

(21) Appl. No.: 17/954,695

(22) Filed: Sep. 28, 2022

(65) Prior Publication Data

US 2023/0021472 A1 Jan. 26, 2023

Related U.S. Application Data

(63) Continuation of application No. PCT/CN2020/098351, filed on Jun. 28, 2020.

(51) Int. Cl.
*G06F 30/398* (2020.01)
*G06F 111/04* (2020.01)

(52) U.S. Cl.
CPC ........ *G06F 30/398* (2020.01); *G06F 2111/04* (2020.01)

(58) Field of Classification Search
USPC ........................................................ 716/119
See application file for complete search history.

(56) References Cited

U.S. PATENT DOCUMENTS

| 8,868,954 B1 | 10/2014 | Balakrsihnan et al. | |
|---|---|---|---|
| 2017/0337468 A1* | 11/2017 | Bruestle | H04L 49/1507 |
| 2019/0205696 A1* | 7/2019 | Owechko | G06F 18/2134 |

(Continued)

FOREIGN PATENT DOCUMENTS

| CN | 116134416 A * | 5/2023 | ........... G06F 30/398 |
|---|---|---|---|
| WO | 2017124041 A1 | 7/2017 | |
| WO | WO-2022000101 A1 * | 1/2022 | ........... G06F 12/023 |

OTHER PUBLICATIONS

John Thornton et al, A Two Level Local Search for MAX-SAT Problems with Hard and Soft Constraints, Dec. 2002, 12 pages.

(Continued)

*Primary Examiner* — Mohammed Alam
(74) *Attorney, Agent, or Firm* — BCF LLP

(57) ABSTRACT

A method for optimizing a layout of a tensor memory defines at least one hard constraint for allocating a plurality of input/output (I/O) vectors for reading and writing data for a task in the tensor memory. The at least one hard constraint is applied to determine one or more potential conflicts between the plurality of I/O vectors. One or more soft constraints aimed at mitigating the one or more potential conflicts between the I/O vectors may also be generated. The at least one hard constraint is applied in a maximum satisfiability (MaxSAT) solver. The one or more soft constraints may also be applied in the MaxSAT solver. The MaxSAT solver determines locations of the data in the tensor memory. The starting addresses of the input data to be read and of output data to be written by each of the I/O vectors are updated in the tensor memory.

13 Claims, 15 Drawing Sheets

(56) References Cited

U.S. PATENT DOCUMENTS

2020/0183837 A1* 6/2020 Gu .................... G06F 15/8046
2021/0049463 A1* 2/2021 Ruff .................... G06N 3/0495

OTHER PUBLICATIONS

International Search Report and Written Opinion issued in corresponding International application No. PCT/CN2020/098351 on Mar. 25, 2021.
Cho, J. et al., Fast Memory Bank Assignment for Fixed-Point Digital Processors, ACM Transactions on Design Automation of Electronic Systems, vol. 9, No. 1, p. 52-74, Jan. 2004.
Open-WBO MaxSAT Solver, http://sat.inesc-id.pt/open-wbo/, Jun. 2020.
Leupers, R. et al., Variable partitioning for dual memory bank DSPS, University of Dortmund, IEEE, 2001.

* cited by examiner

Figure 2

METHOD TO AVOID MEMORY BANK CONFLICTS AND PIPELINE CONFLICTS IN TENSOR MEMORY LAYOUT

CROSS-REFERENCE TO RELATED APPLICATIONS

The present application is a continuation of and claims priority to International Patent Application No. PCT/CN2020/098351, filed on Jun. 28, 2020, the disclosure of which is incorporated by reference herein in its entirety.

TECHNICAL FIELD

The present disclosure generally relates to the field of computer systems and, in particular, to a method for optimizing a layout of a tensor memory and to a tensor memory layout optimization module.

BACKGROUND

Some large computing environments comprise one or more powerful processors and large amounts of memory capable of storing gigabytes or terabytes of information. A practical manner of improving computational speed involves moving data related to a task from a global memory to a smaller local memory for the duration of the task. A processing unit may then perform operations on the data contained in the local memory, without the need to perform read and write operations in the global memory. The data, which will oftentimes have been modified by the task processing, is then returned to the global memory once the task is completed.

Several tasks related to the same data content stored in the local memory may be performed in parallel (either simultaneously or concurrently). Memory storage conflicts and pipeline conflicts may occur between different types of operations due to parallel execution of operations in vector, scalar, load storage unit pipelines, and between operations of the same type due to pipelining of operations in their pipeline. Pipeline conflicts cause performance regression through loss of instruction level parallelism. Memory storage conflicts may occur, for example, when attempts are made to read or write information in overlapping parts of the local memory. Such memory storage conflicts may cause read stalls or write stalls, which also increase instruction execution time.

In applications implemented on graphical processing units (GPU) or on digital signal processors (DSP), compilers are usually not able to efficiently assign data to the various parts of the local memory. As a consequence, it is frequently required to manually allocate memory.

Consequently, there is a need for techniques for optimizing the allocation of memory in local memories.

SUMMARY

An object of the present disclosure is to provide a method for optimizing a layout of a tensor memory. Optimizing generally includes improving the layout, and does not necessarily involve finding the best possible layout under all conditions. At least one hard constraint is defined for allocating a plurality of input/output (I/O) vectors for reading input data or writing output data in the tensor memory, the tensor memory storing data for execution of a task. The at least one hard constraint is applied to determine one or more potential conflicts between the plurality of I/O vectors. The at least one hard constraint is applied in a maximum satisfiability (MaxSAT) solver to determine locations of the input data and of the output data in the tensor memory. The starting addresses of the input data to be read and of the output data to be written by each of the plurality of I/O vectors are updated in the tensor memory.

In accordance with other aspects of the present disclosure, the method further comprises generating one or more soft constraints aimed at mitigating the one or more potential conflicts between the plurality of I/O vectors, the one or more soft constraints being also applied in the MaxSAT solver to determine locations of the input data and of the output data in the tensor memory.

In accordance with other aspects of the present disclosure, the tensor memory is a local memory. The method further comprises transferring the data from a global memory to the local memory for processing of the data by a processing unit executing the task. The method also comprises concurrently reading, by the processing unit, first data from the local memory using a first one of the I/O vectors, reading, by the processing unit, second data from the local memory using a second one of the I/O vectors, and writing, by the processing unit, third data into the local memory using a third one of the I/O vectors, the reading of the first and second data and the writing of the third data being made while complying to the at least one hard constraint.

In accordance with other aspects of the present disclosure, the local memory comprises a plurality of tiers, each tier comprising a plurality of memory banks. Bank groups contain a corresponding memory bank of each of the plurality of tiers. A part of the first data is written in one or more first memory banks. A part of the second data is written in one or more second memory banks. A part of the third data is written in one or more third memory banks. There is no intersection between the first, second and third memory banks. The one or more first memory banks and the one of more second memory banks are not part of the same bank groups.

In accordance with other aspects of the present disclosure, the method further comprises performing at least one of a liveness analysis, a pipeline analysis and a memory bank conflict analysis on the local memory before generating the one or more soft constraints and the at least one hard constraint.

In accordance with other aspects of the present disclosure, the at least one hard constraint is selected from (i) preventing simultaneous reading and writing in a same memory bank, (ii) preventing simultaneous reading of more than one input in the same bank group, (iii) starting addresses of input and output data are integer multiples of $0.5 \cdot W$, wherein W is a tier width, (iv) between two distinct inputs to be concurrently read from the local memory, a first input has a starting address being an even-integer multiple of $0.5 \cdot W$ and a second input has a starting address being an odd-integer multiple of $0.5 \cdot W$, and (v) a combination thereof.

In accordance with other aspects of the present disclosure, the one or more soft constraints and the at least one hard constraint are applied to the MaxSAT solver in Boolean clause format.

In accordance with other aspects of the present disclosure, generating the one or more soft constraints comprises a) generating soft read-read conflict clauses using starting address Boolean variables, the starting address Boolean variables being true when an I/O vector i starts at an address $0.5 \cdot W \cdot j$, in which j is an odd value, and b) generating soft read-write conflict clauses using read-write Boolean tier variables, the read-write Boolean tier variables being true when the I/O vector i used for a read operation is in a same tier as an I/O vector j used for a write operation.

In accordance with other aspects of the present disclosure, generating the one or more soft constraints further comprises c) calculating a cost for a pipeline conflict as a sum of 1 plus costs for all clauses calculated in a) and b), and d) generating pipeline conflict clauses using Boolean overlap variables, the Boolean overlap variables being true when the I/O vector i overlaps then I/O vector j.

In accordance with other aspects of the present disclosure, defining the at least one hard constraint comprises e) calculating a cost of hard clauses as a sum of 1 plus the costs for all generated in a), b), c) and d), f) generating hard clauses for non-overlap of I/O vectors with intersecting live ranges using Boolean cover variables, the Boolean cover variables being true when an I/O vector i has any data at address $0.5 \cdot W \cdot j$, g) generating hard clauses constraining all Boolean variables used in a), b), c), d) e) and f) using an original I/O vector if, in which i starts at address $0.5 \cdot W \cdot j$, and h) generating hard clauses while ensuring that all I/O vectors have a starting address and that all I/O vectors are allocated in the local memory.

In accordance with other aspects of the present disclosure, the MaxSAT solver determines the locations of the input and the output data in the local memory by application of the Boolean clauses.

In accordance with other aspects of the present disclosure, the local memory contains 64 memory banks distributed among 4 tiers and 16 bank groups, each memory bank contains 128 rows that each contains 32 bytes, whereby the tier width W is equal to 512 bytes.

Another object of the present disclosure is to provide a tensor memory layout optimization module. The tensor memory layout optimization module comprises an input device adapted to receive information about a tensor memory and about a task to be executed on data contained in the tensor memory, an output device adapted to output starting addresses of data elements contained in the tensor memory, a processor operatively connected to the input device and to the output device, and a non-transitory computer-readable medium for storing instructions that are executable by the processor to implement a method for optimizing a layout of the tensor memory.

A further object of the present disclosure is to provide a tensor memory layout optimization module. The tensor memory layout optimization module comprises an input device adapted to receive information about a tensor memory and about a task to be executed on data contained in the tensor memory, an output device adapted to output starting addresses of data elements contained in the tensor memory, and a processor operatively connected to the input device and to the output device. The processor is adapted for receiving, from the input device, the information about the tensor memory and about the task to be executed on the data contained in the tensor memory, defining at least one hard constraint for allocating a plurality of input/output (I/O) vectors for reading input data or writing output data in the tensor memory, applying the at least one hard constraint to determine one or more potential conflicts between the plurality of I/O vectors, applying the at least one hard constraint in a maximum satisfiability (MaxSAT) solver determine locations of the input and the output data in the tensor memory, and causing the output device to update the starting addresses, in the tensor memory, of the input data to be read and of the output data to be written by each of the plurality of I/O vectors.

In accordance with other aspects of the present disclosure, the processor is further adapted for generating one or more soft constraints aimed at mitigating the one or more potential conflicts between the plurality of I/O vectors, and for applying the one or more soft constraints with the at least one hard constraint in the MaxSAT solver to determine locations of the input data and of the output data in the tensor memory.

In accordance with other aspects of the present disclosure, the tensor memory layout optimization module further comprises an internal memory device operatively connected to the processor. The input device is further adapted for receiving information about the structure of the tensor memory, about the I/O vectors, about live ranges of the I/O vectors, and about potential pipeline conflicts between operations being performed as part of the task. The processor is further adapted for storing the information about the structure of the tensor memory, about the I/O vectors, about live ranges of the I/O vectors, and about potential pipeline conflicts between operations being performed as part of the task in the internal memory device.

In accordance with other aspects of the present disclosure, the output device is adapted to forward the starting addresses of data elements contained in the tensor memory to a processing unit of a computing environment or to a global memory of the computing environment.

BRIEF DESCRIPTION OF THE FIGURES

The features and advantages of the present disclosure will become apparent from the following detailed description, taken in combination with the appended drawings, in which:

FIG. 2 is a map of a local memory part of the memory configuration of FIG. 1 according to an embodiment of the present disclosure;

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

Generally speaking, the present disclosure describes a tensor memory layout optimization technique intended to mitigate and alleviate potential conflicts between concurrent read and write operations of data in a tensor memory, for example in a local memory. One or more hard constraints to the allocation of input/output (I/O) vectors (also called I/O buffers, I/O arrays, or I/O tensors) for reading input data or writing output data in the local memory are defined. These hard constraints are used to determine potential conflicts between the I/O vectors. Soft constraints, which may be understood as representing optimization objectives, may be generated with the intent to mitigate the potential conflicts. These soft and hard constraints may be applied in the form of Boolean clauses to a maximum satisfiability solver to locate the data to be read and written in the local memory. Starting addresses, in the local memory, for the input data to be read and for the output data to be written by the I/O vectors are updated. In this manner, the potential conflicts between the read and/or write operations in the local memory by the various I/O vectors are mitigated. In some systems, a large number of concurrent tasks may be executed on the data contained in the local memory, so some conflicts may not be entirely avoided. Regardless, the number of potential conflicts is reduced and the processing performance is substantially improved.

Figure 1:
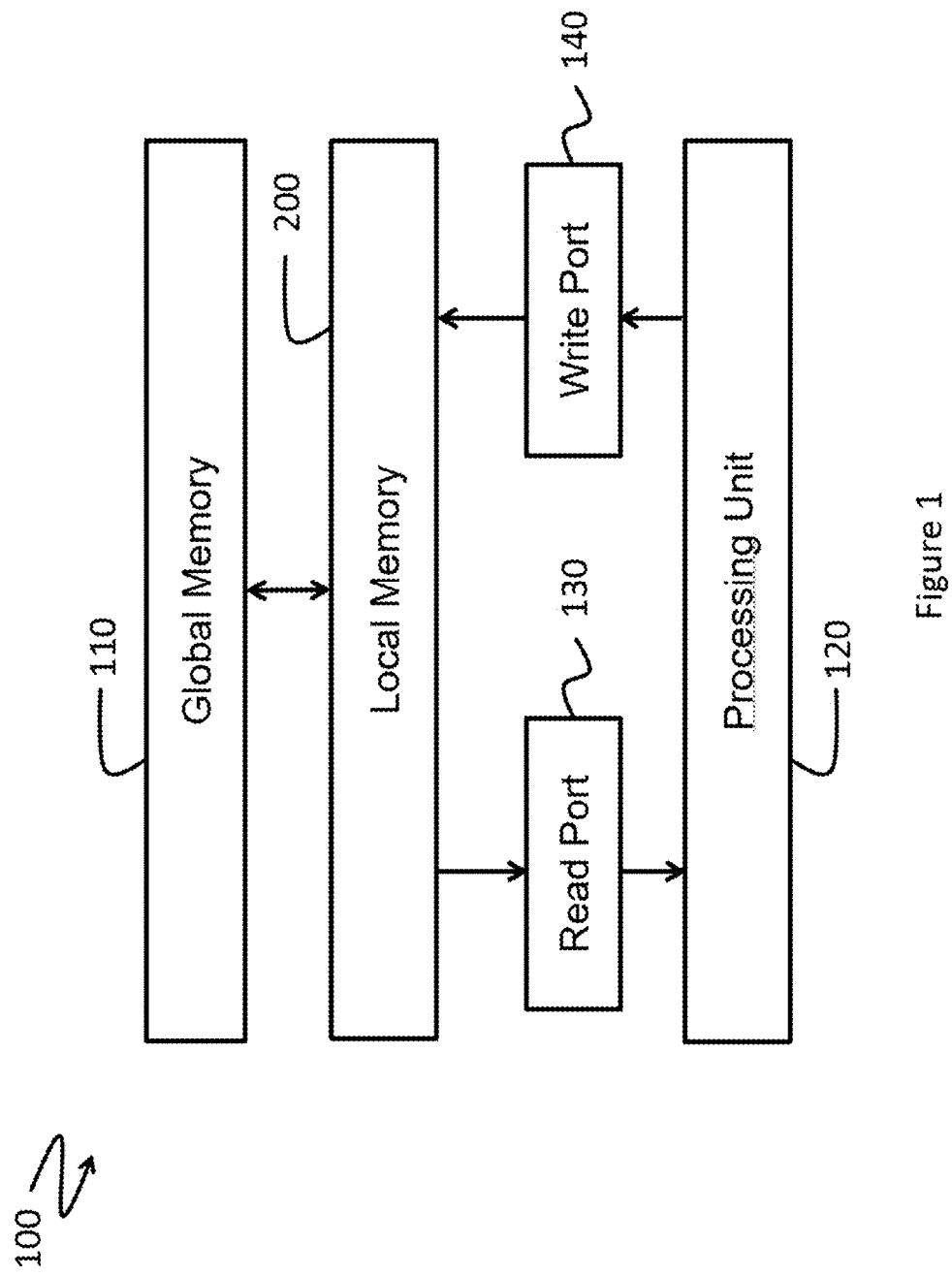
FIG. 1 is a block diagram showing a computing environment according to an embodiment of the present disclosure.

FIG. 1 is a block diagram showing a computing environment according to an embodiment of the present disclosure. A computing environment 100 comprises a global memory 110, a processing unit 120, a read port 130 and a write port 140. The computing environment 100 includes other components, for example and without limitation, additional buffers, memory caches, synchronizers, interface ports, and the like (not shown); these components are not depicted on FIG. 1 for simplicity.

The global memory 110 may be very large, for example comprising gigabytes or terabytes of data. In order to allow fast read and write access and fast vector operations for a given task, a portion of the data from the global memory 110 is copied into a smaller local memory 200 of the computing environment 100 and copied back into the global memory 110 when the given task is complete. For example and without limitation, the local memory 200 may comprise tens or hundreds of kilobytes of data. Copying the portion of the data from the global memory 110 to the local memory 200 and back into the global memory 110 may be performed using any suitable conventional mechanism not being part of the scope of the present disclosure.

In a given cycle, the processing unit 120 may read a 512-byte data vector from the local memory 200 by use of the read port 130, and write a 512-byte data vector into the local memory 200 by use of the write port 140. The read port 130 and the write port 140 are therefore designed such that they can access a limited portion of the local memory 200 to read and/or write date in the local memory 200 in each given cycle.

The processing unit 120 may perform a plurality of concurrent vector operations on the data contained in the local memory 200. Situations in which a particular information element contained in the local memory 200 is modified by a first operation while it is read by another operation may cause data errors cause by conflicting operations. It could be relatively easy to avoid such data errors by ensuring that no two operations can be performed at the same time within the computing environment 100, but the impacts in terms of performance caused by processing delays would be unacceptable. The following paragraphs will describe a structure of the local memory 200 and a method for reading and writing therein that prevents data errors caused by conflicts while minimizing the processing delays.

Figure 2:
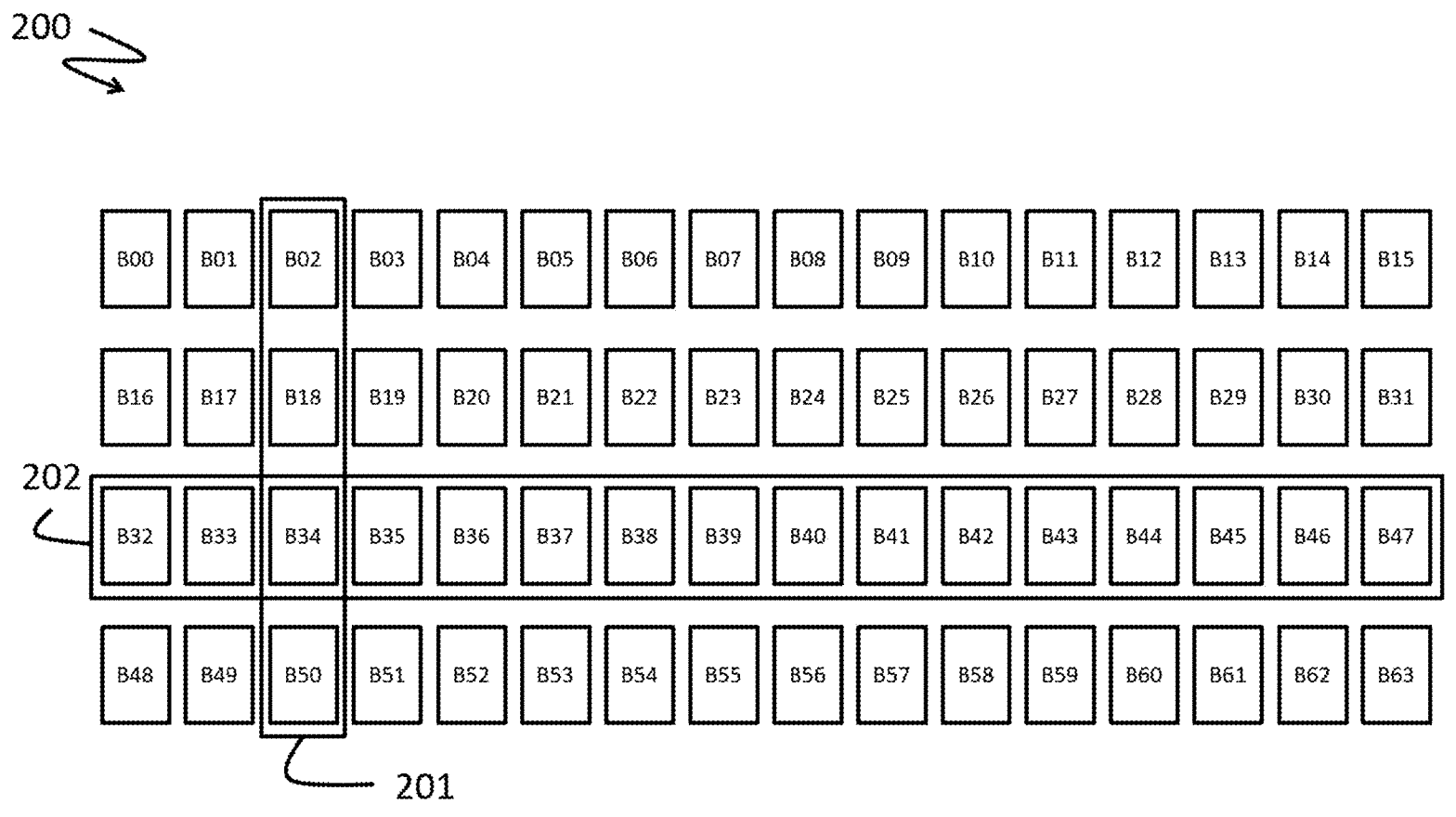

FIG. 2 is a map of a local memory part of the memory configuration of FIG. 1 according to an embodiment of the present disclosure. In a non-limiting example, the local memory 200 contains 64 memory banks numbered B00 to B63, each memory bank storing 4 Kbytes of data. The memory banks are distributed in one dimension among 16 bank groups that each contains 4 memory banks. For example, one such bank group 201 includes memory banks B02, B18, B34 and B50. The memory banks are distributed in another dimension among 4 tiers that each contains 64 Kbytes of memory distributed over 16 memory banks. For example, one such 64-Kbyte tier 202 includes memory banks B32 to B47. Other configurations of the local memory 200 may contain larger or smaller numbers of memory banks distributed over various numbers of bank groups and tiers. For example, the local memory 200 may contain 64 memory banks distributed among 8 bank groups that each contains 8 memory banks, the local memory 200 defining 8 32-Kbyte tiers. In another example, the local memory 200 may contain 32 memory banks distributed among 4 bank groups that each contains 8 memory banks, the local memory 200 defining 8 16 K-byte tiers. Memory banks having more or less than 4 Kbytes may also be implemented. Other configurations may also be contemplated. The configuration of the local memory 200 is selected for consistency with a configuration of the read port 130 and of the write port 140, as will be explained hereinbelow.

Figure 3A:
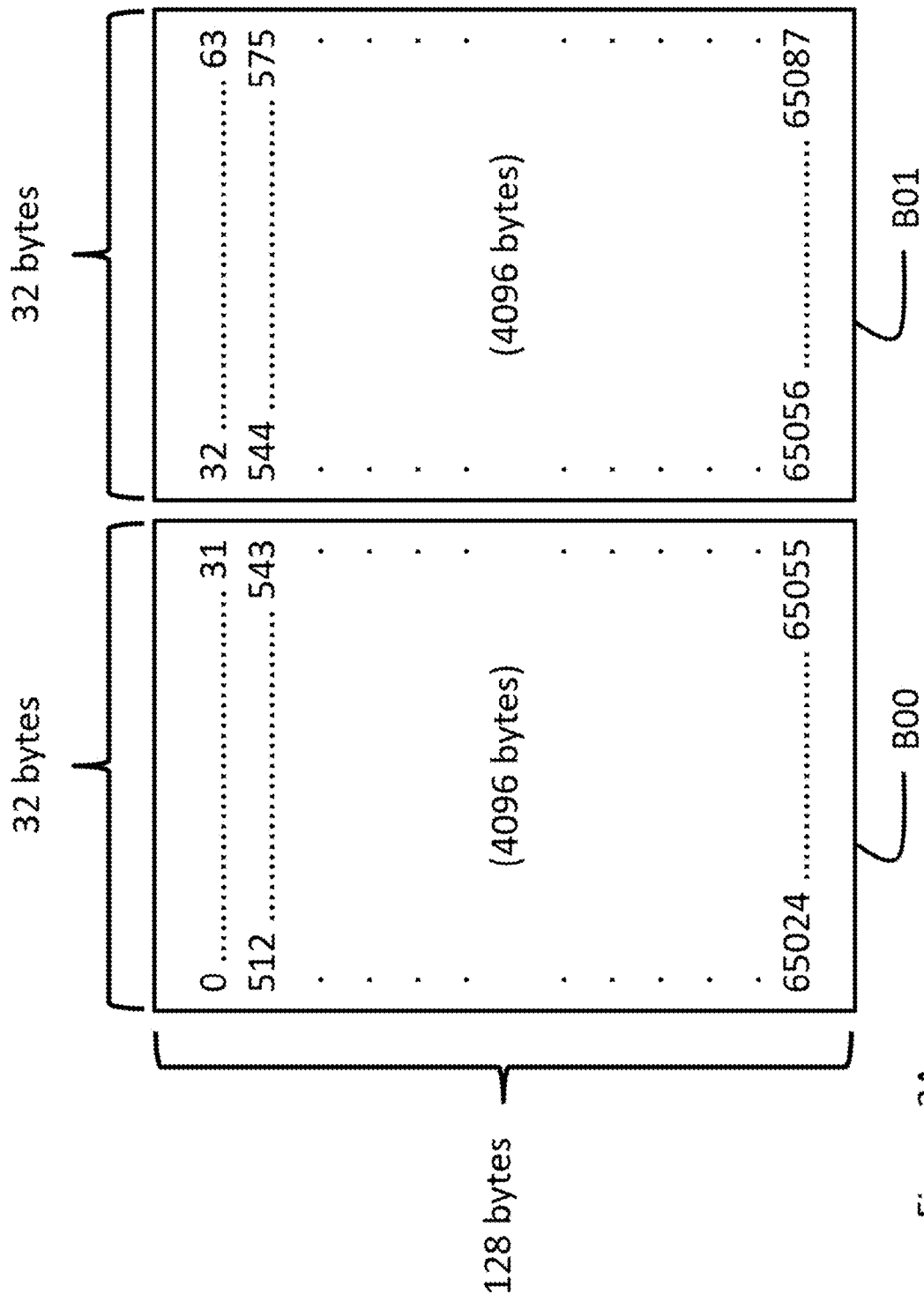
FIG. 3A is an illustration of two first memory banks of the local memory of FIG. 2 according to an embodiment of the present disclosure.
Figure 3B:
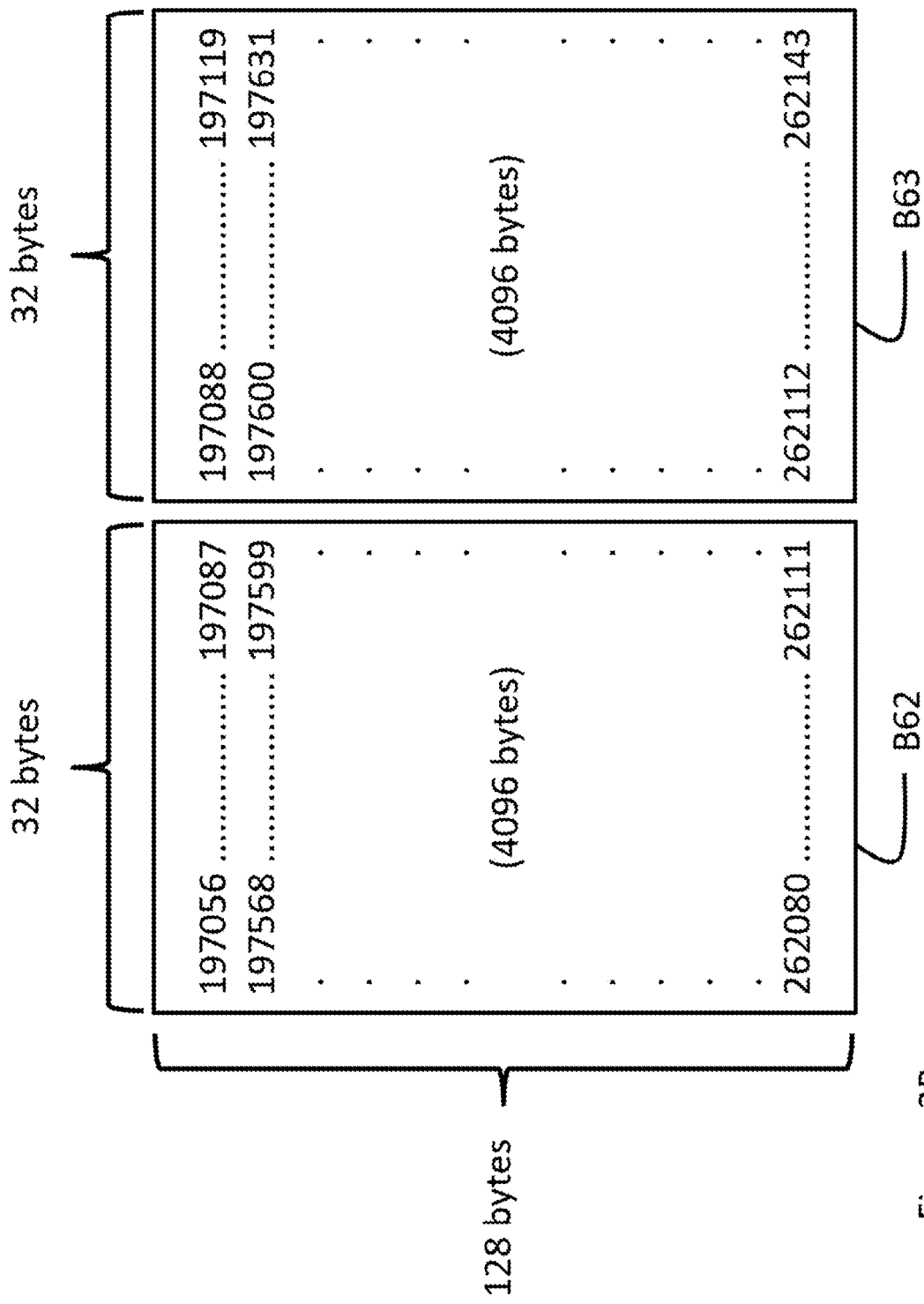
FIG. 3B is an illustration of last two memory banks of the local memory of FIG. 2 according to an embodiment of the present disclosure.

FIG. 3A is an illustration of two first memory banks of the local memory of FIG. 2 according to an embodiment of the present disclosure. FIG. 3B is an illustration of last two memory banks of the local memory of FIG. 2 according to an embodiment of the present disclosure. In this embodiment, each memory bank B00 to B63 may contain 4096 bytes (4 Kbytes) of data, so the local memory 200 may contain 262144 bytes (256 Kbytes) of data. Each memory bank has a 32-byte width and a 128-byte depth. The local memory 200 is addressable as shown on FIGS. 3A and 3B so that a first address 0 is found in a first row (row number 0) of the memory bank B00. Addresses 0-31 form the first row of the memory bank B00, and addresses 32-63 form the first row of the next memory bank B01, until address 511 is found at the end of the first row (not shown) of the memory bank B15. Then address 512 is found on the second row (row number 1) of the memory bank B00. The sequence continues until the very last address 262143 is found on the last row (row number 127) of the last memory bank B63.

Returning to FIG. 2, the structure of the local memory 200 as well as hardware structures of the read port 130 and of the write port 140 are such that data cannot be read in more than one memory bank of a same bank group (such as the memory banks B02, B18, B34 and B50 of the memory bank 201) at once and that data cannot be simultaneously read and written in the same memory bank.

When two or more vector operations are reading and writing data contained in the same memory bank, or reading two input data in the same memory bank group, these operations cause memory bank conflicts and cannot be performed in parallel. Memory bank conflicts may cause processing stalls, resulting in slowing down the computing system 100. Considering the local memory 200, an attempt to read two inputs in the same bank group (e.g. in the memory banks B00 and B16) could potentially increase the time required to read these inputs by a factor of 16 because reading these inputs concurrently in the memory banks B00 and B16 would be disallowed.

Pipeline conflicts may also occur given that, in frequent cases, an operation of the computing environment 100 will cause data to be read and written in overlapping parts of the local memory 200. Execution of a second operation may need to wait for a first operation to be completed. Pipeline conflicts may extend over a plurality of operations that cannot be executed in parallel. In the present context, the term "cost" (sometimes referred to as "weight") as applied to a given conflict represents an amount of time used by the computing environment 100 to overcome the given conflict. Frequently, pipeline conflicts may be more costly than memory bank conflicts because a pipeline conflict may cause a next operation to be delayed until a current one is completed.

The structure of the computing environment 100 therefore imposes a few hard constraints to reading and writing operations, these hard constraints being defined in order to prevent conflicts. The present technology uses these hard constraints for optimizing a tensor memory layout for allocating data in the local memory 200 at compilation time:

Concurrent operations may not read and/or write within a same area of the local memory 200 at the same time—otherwise stated, the live range of an input or output for one operation may not intersect the live range of another input or output for another concurrent operation.

While it is possible to concurrently read data from one memory bank from each group (a total of 16 memory accesses in the example of FIG. 2) in a given cycle, it is not allowed to read data from more than one memory bank in the same bank group in each cycle.

While it is possible to concurrently read data in any memory bank and write data any other memory bank, data may not be read and written in the same memory bank in any given cycle.

A block of data that may be read from the local memory 200, or written into the local memory 200, has a starting address equal an integer multiple of 0.5·W, wherein W is a tier width, the tier width being equal to 512 bytes in the example of FIG. 2. In that example, the block of data has a starting address equal to n·256, wherein n is in a range [0-1023], for alignment with the structure of the read port 130 and of the write port 140. In the example of the local memory 200, there can be 1024 different starting addresses, a last possible starting address $M_l$ being 261888 (for n=1023), for an eventual block of data having 256 bytes extending from address 261888 to the address 262143 in the memory bank B63. Some implementations of the local memory 200 may impose a smaller range of possible range for values of n, being for example defined in a range [0-991], a last possible starting address $M_1$ being 253696 (for n=991).

Read-read conflicts between two distinct inputs to be read from the local memory 200 may be avoided when the starting address of one of these inputs is an even-integer multiple of 256 bytes and the starting address of the other of these inputs is an odd-integer multiple of 256 bytes, in the absence of any overlap between the two inputs within the local memory 200.

FIGS. 4A to 4E illustrate concurrent reading and writing operations by the read port and the write port on the local memory part of FIG. 2 according to an embodiment of the present disclosure. The read port 130 and the write port 140 (FIG. 1) have vector widths that correspond to the tier width of the local memory 200. In the particular example of FIG. 2, the local memory 200 has a 512-byte width (defined as 32 bytes per memory bank times 16 memory bank groups), so the read port 130 and the write port 140 have vector widths of 512 bytes. Two halves 204A and 204B of the vector width of the read port 130 may be defined. In case of a binary operation, the full 512-byte width of the read port 130 may be used, reading 256 bytes each of two inputs. In case of a unary operation, only half of the capacity of the read port 130 is used, reading 256 bytes. Writing operations may frequently be applied on 256 bytes, although a copy operation within the local memory 200 may read and write 512 bytes at a time. The illustration of FIGS. 4A to 4E demonstrates how data may be read and written in various memory banks of the local memory 200 over a number of successive cycles.

Figure 4A:
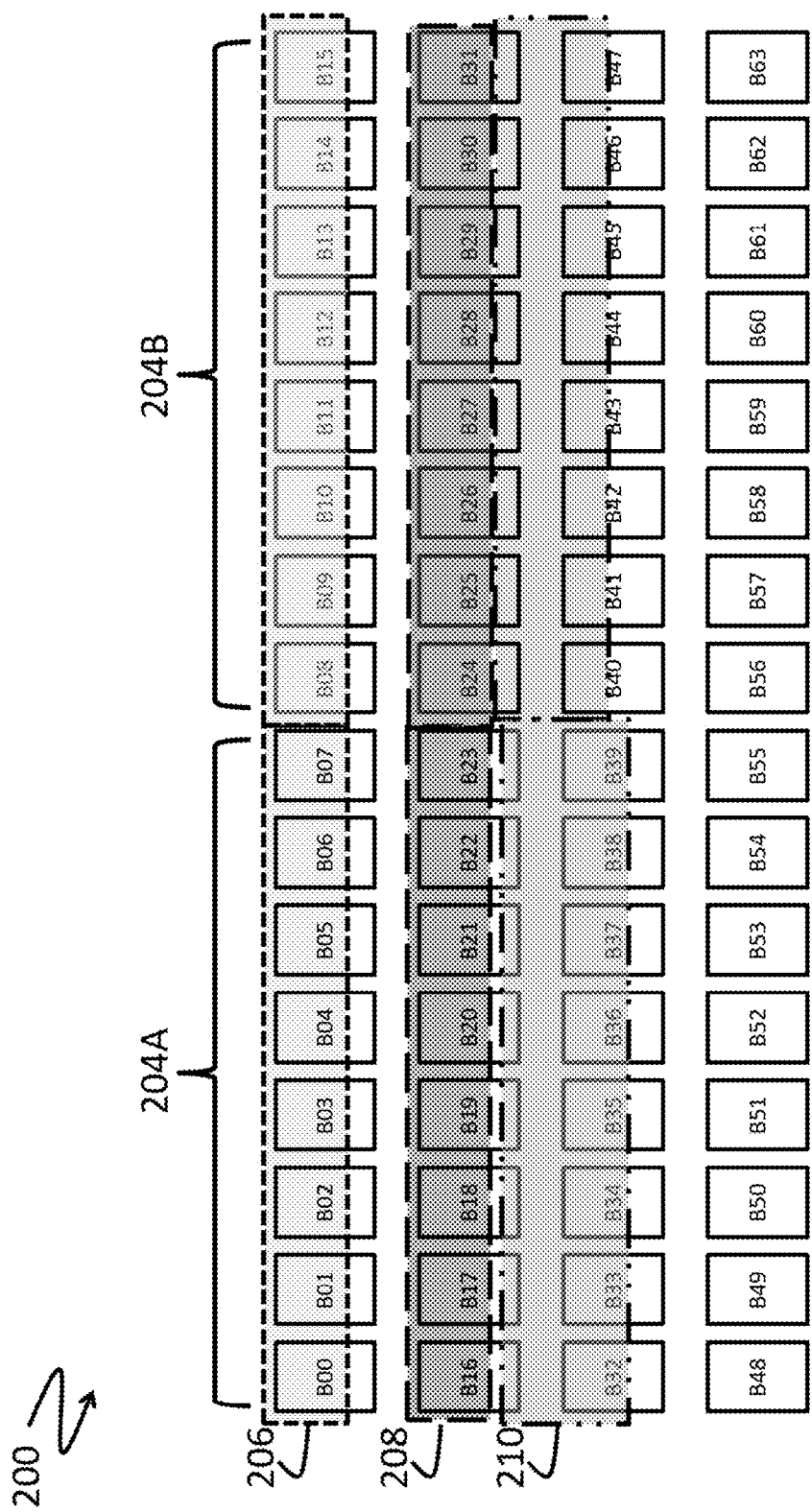
FIGS. 4A to 4E illustrate concurrent reading and writing operations by the read port and the write port on the local memory part of FIG. 2 according to an embodiment of the present disclosure.

In more details, in a non-limiting example, FIG. 4A shows that a first input 206 is to be read in parts of the memory banks B00 to B15 while, concurrently, an output 208 is to be written in parts of the memory banks B16 to B31 and an input 210 is to be read in parts of the memory banks B16 to B47. In this example, read-read conflicts may occur when simultaneously reading in the memory banks B00, B16 and B32, given that they are part of the same bank group comprising B00, B16, B32 and B48. In fact, potential conflicts may occur between all bank groups when reading the first input 206 and the second input 210 simultaneously. Also, read-write conflicts may occur when simultaneously reading parts of the second input 210 and writing parts of the output 208 in the memory banks B16 to B31. In an aspect of the present disclosure, such read-read and read-write conflicts are avoided as illustrated in FIG. 4B to 4E.

In the example of FIG. 4A, the first input 206, the second input 210 and the output 208 all have a size of 49152 bytes (48 Kbytes). The first input 206 starts at address 0 in the memory bank B00 (FIG. 3A) and ends at address 49151 in the memory bank B15. The first input 206 fills 96 rows of possible 128 rows (rows numbers 0 to 95) of the memory banks B00 to B15. The output 208 starts in the first address of a top row of the memory bank B16, which is address 65536. The output 208 occupies the first 96 rows (rows numbers 0 to 95) of each of the memory banks B16 to B31. The second input 210 occupies the last 24 rows (rows numbers 104 to 127) of the memory banks B24 to B31 (6144 bytes), the last 12 rows (rows numbers 116 to 127) of the memory banks B16 to B23 (3072 bytes), the first 84 rows (rows numbers 0 to 83) of the memory banks B32 to B39 (21504 bytes), and the first 72 rows (rows numbers 0 to 71) of the memory banks B40 to B47 (18432 bytes), for a total of 49152 bytes (48 Kbytes). The span of the inputs and output as shown on FIG. 4A and in the following Figures is for illustration purposes and is not to scale.

FIGS. 4B to 4E illustrate a non-limiting example of a sequence comprising a number of cycles implemented by repeating 4 distinct phases for concurrently reading the inputs 206 and 210 while writing the output 208. Each of the 4 phases is repeated a respective number of times sufficient to read the inputs 206 and 210 and to write the output 208, as will be expressed in the following paragraphs. In any given phase, a maximum of 512 bytes of the inputs 206 and/or 210 may be read in the local memory 200, and a maximum of 512 bytes of the output 208 may be written in the local memory 200, these reading and writing operations being made in consideration of the above-described hard constraints in order to minimize a number of conflicts. The order of the phases may be varied.

Figure 4B:
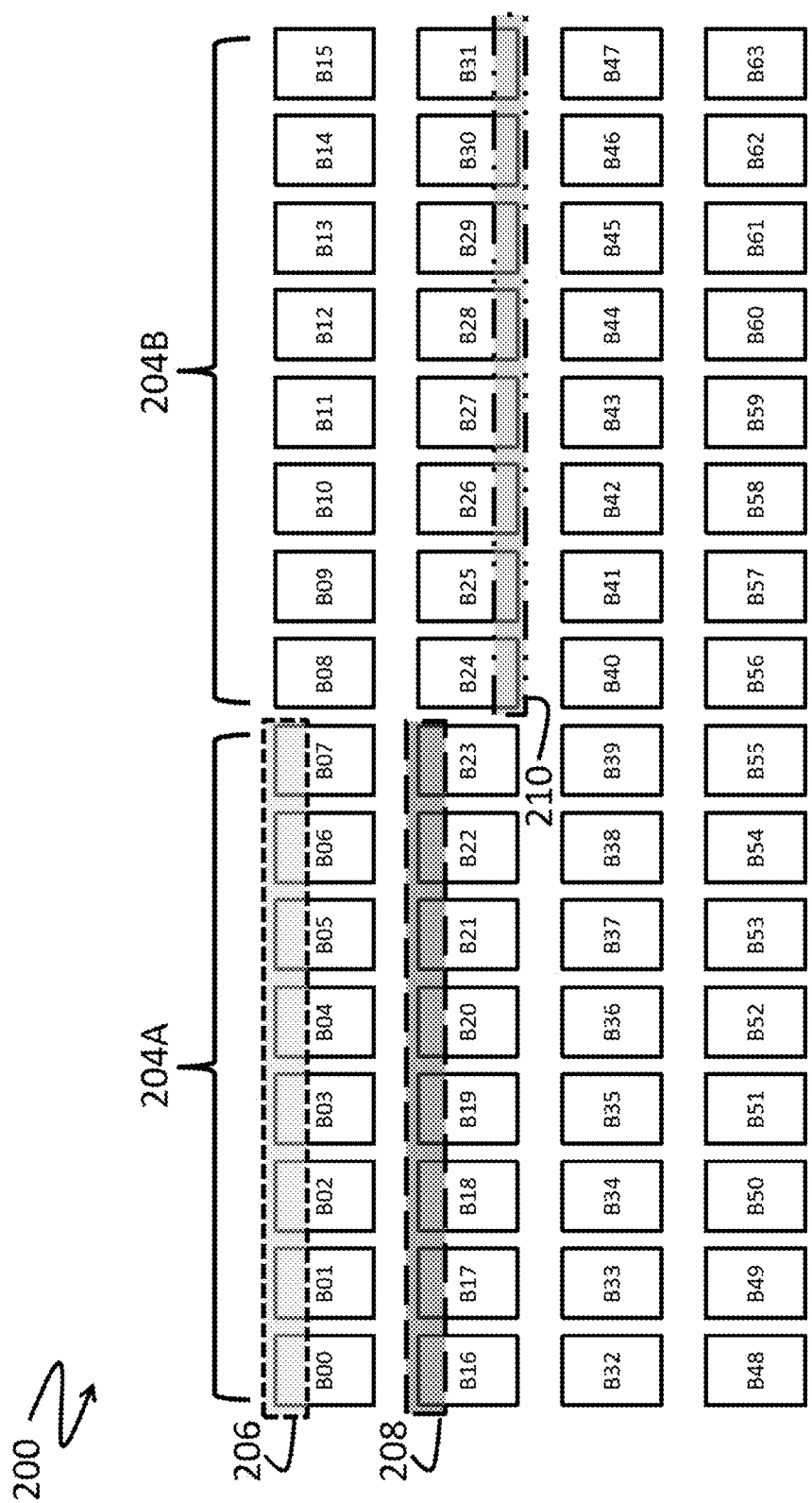

FIG. 4B shows that, in a first instance of a first phase, data of the first input 206 is read by the read port 130 in a first row (i.e. row number 0) of the memory banks B00 to B07 while data of the second input 210 is read by the read port 130 in a first row (i.e. row number 96) of the memory banks B24 to B31. At the same time, data is written by the write port 140 in a first row (row number 0) of the memory banks B16 to B23. In this context, considering that the second input 210 starts on the row number 104 of the memory bank B24, the term "first row" does not necessary designate the topmost row of the various memory banks, but rather a first row of the memory banks in which data is to be read for a given input, or written for a given output. The first phase is repeated 24 times (i.e. over 24 cycles), i.e. until the content of the second input 210 stored in the bottom 24 rows of the memory banks B24 to B31 (rows 104 to 127) has been read. As shown on FIG. 4B, data of the first and second inputs 206 and 210 is read from memory banks that are not part of the same bank groups, and data is not concurrently read and written in the same memory banks.

Figure 4C:
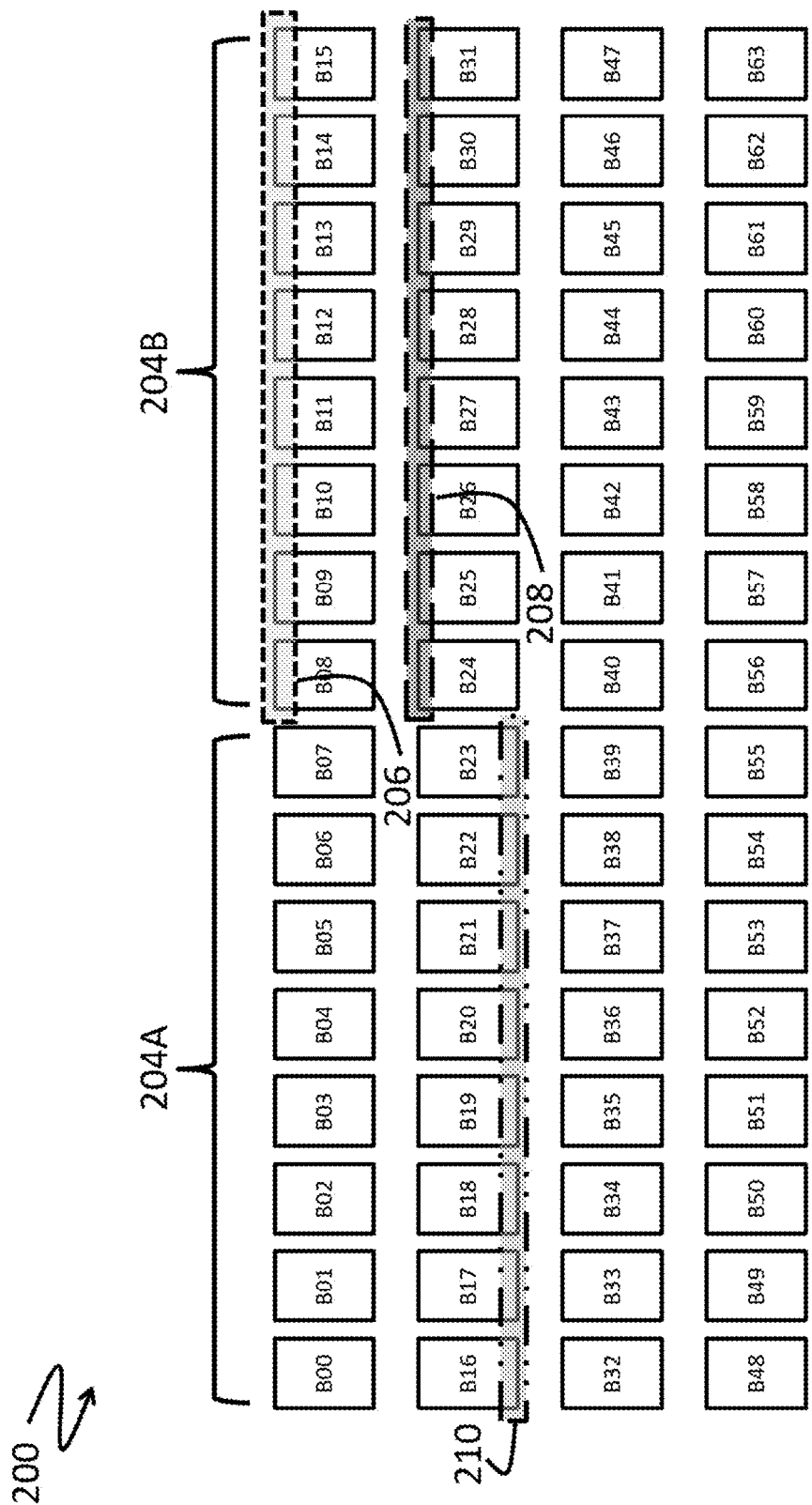

FIG. 4C shows that, in first instance of a second phase, data of the first input 206 is read by the read port 130 in a first row (i.e. row number 0) of the memory banks B08 to B15 while data of the second input 210 is read by the read port 130 in a first row (i.e. row number 116) of the memory banks B16 to B23. At the same time, data is written by the write port 140 in a first row (i.e. row number 0) of the memory banks B24 to B31. The second phase is repeated 12 times (i.e. over 12 cycles), i.e. until the content of the second input 210 stored in the bottom 12 rows of the memory banks B16 to B23 (rows 116 to 127) has been read. As in the case of FIG. 4B, data of the first and second inputs 206 and 210 is read from other memory banks that are not part of the same bank groups, and data is not concurrently read and written in the same memory banks.

Figure 4D:
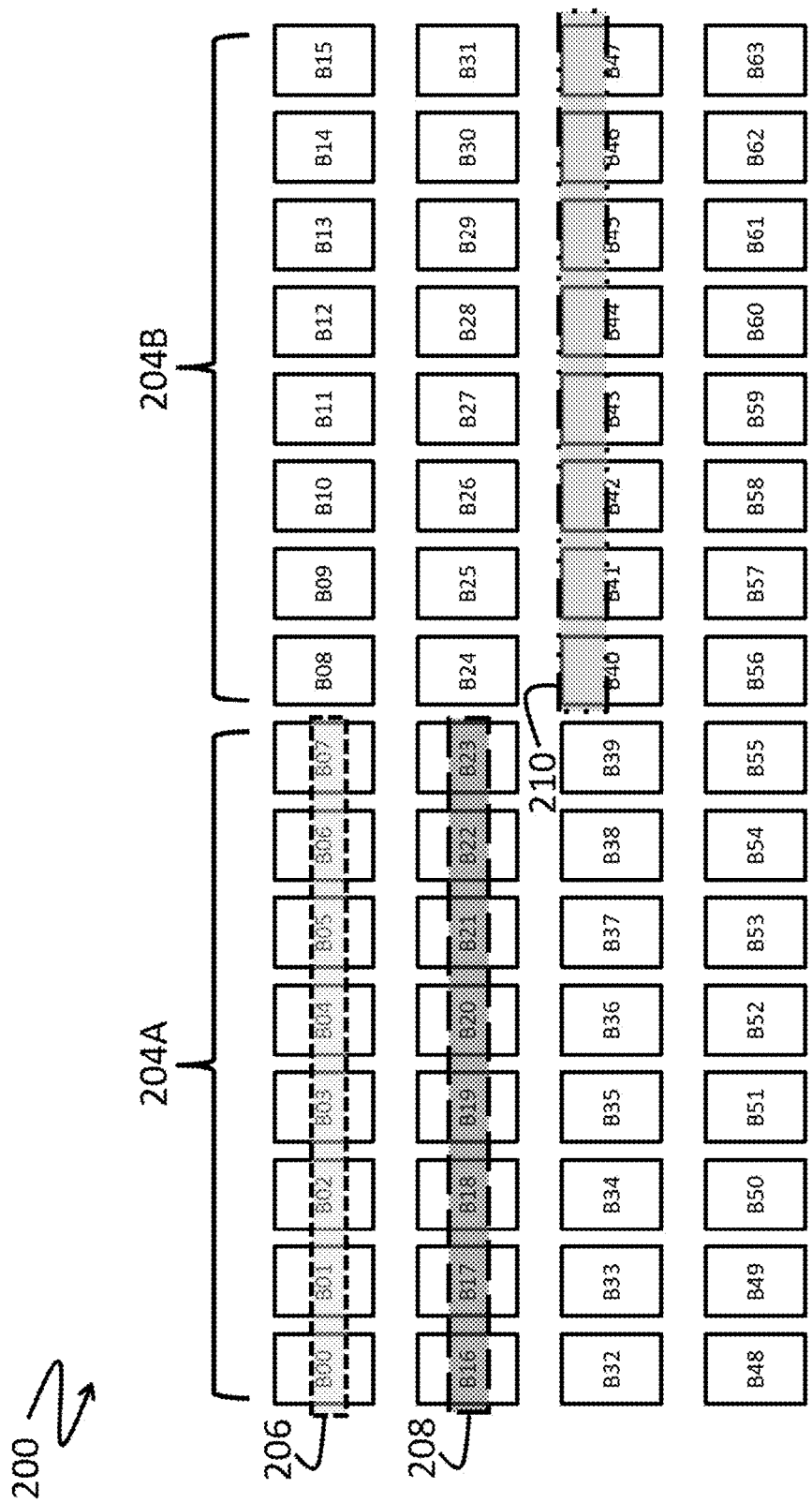

FIG. 4D shows that, in a first instance of a third phase, data of the first input 206 is read by the read port 130 in a $25^{th}$ row (i.e. row number 24) of the memory banks B00 to B07 while data of the second input 210 is read by the read port 130 in a $25^{th}$ row (i.e. row number 0) of the memory banks B40 to B47. At the same time, data is written by the write port 140 in a $25^{th}$ row (row number 24) of the memory banks B16 to B23. The third phase is repeated 72 times (i.e. over 72 cycles), i.e. until the content of the second input 210 stored in the top 72 rows of the memory banks B40 to B47 (rows 0 to 71) has been read, at which time the content of the first input 206 stored in the top 96 rows of the memory banks B00 to B07 (rows 0 to 95) has also been read and the content of the output 208 has been written in the top 96 rows of the memory banks B16 to B23 (rows 0 to 95). As in FIGS. 4B and 4C, data of the first and second inputs 206 and 210 is read from memory banks that are not part of the same bank groups, and data is not concurrently read and written in the same memory banks.

Figure 4E:
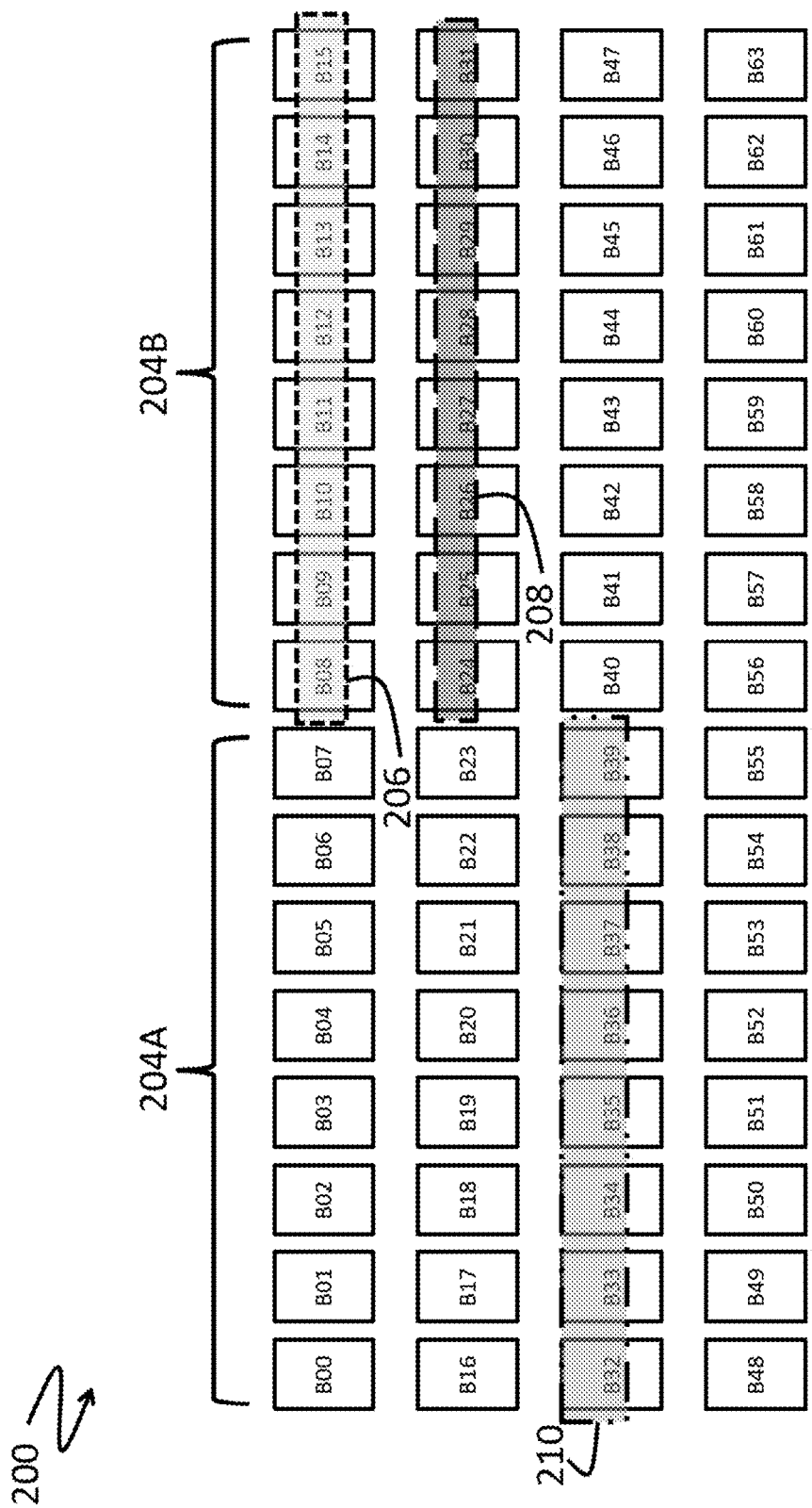

FIG. 4E shows that, in first instance of a fourth phase, data of the first input 206 is read by the read port 130 in a $13^{th}$ row (i.e. row number 12) of the memory banks B08 to B15 while data of the second input 210 is read by the read port 130 in a $13^{th}$ row (i.e. row number 0) of the memory banks B32 to B39. At the same time, data is written by the write port 140 in a $13^{th}$ row (i.e. row number 12) of the memory banks B24 to B31. The fourth phase is repeated 84 times (i.e. over 84 cycles), i.e. until the content of the second input 210 stored in the top 84 rows of the memory banks B32 to B39 (rows 0 to 83) has been read, at which time the content of the first input 206 stored in the top 96 rows of the memory banks B08 to B15 (rows 0 to 95) has also been read and the content of the output 208 has been written in the top 96 rows of the memory banks B24 to B31 (rows 0 to 95). Once again, data of the first and second inputs 206 and 210 is read from memory banks that are not part of the same bank groups, and data is not concurrently read and written in the same memory banks.

The operations of FIGS. 4B to 4E are repeated many times, as the read port 130 and the write port 140 repeatedly access successive 32-byte rows in each memory bank until the first input 206 and the second input 210 are fully read, and until the output 208 is fully written. The following paragraphs present an illustrative, non-limiting example of a sequence for completely reading the first input 206 and the second input 210 while also completely writing the output 208.

It may be noted that, in the non-limiting example of FIGS. 4B to 4E, only half of the available vector width of the write port 140 is used in each phase, the output 208 being only written in the memory banks B16 to B23 or in the memory banks B24 to B31 in each phase. An alternative example may show that the output 208 is written in rows of the memory banks B16 to B31 in some phases, some other phases having no writing operation.

Table I summarizes the number of cycle instances for each of the reading and writing operations distributed in the four phases, in the example of FIGS. 4B to 4E.

TABLE I

|  | Input 206 | Input 210 | Output 208 |
| --- | --- | --- | --- |
| First phase | 24 | 24 | 24 |
| Second phase | 12 | 12 | 12 |
| Third phase | 72 | 72 | 72 |
| Fourth phase | 84 | 84 | 84 |

In the above example, the complete sequence of FIGS. 4B to 4E is therefore executed in 24 instances of the first phase, 12 instances of the second phase, 72 instances of the third phase, and 84 instances of the fourth phase. A total of 192 cycle instances is sufficient to allow the processing unit 120 (FIG. 1) to perform an operation reading the whole of the first input 206 and the second input 210 and writing the whole of the output 208 without creating any memory bank conflict.

In one example, each phase may be executed a number of times as shown on Table I before execution of the next phase. In another example, the first, second, third and fourth phases may be interleaved and sequentially executed 12 times, following which the first, third and fourth phases are executed 12 times, the third and fourth phases being executed 48 times, the fourth phase being finally executed 12 times.

The content of the output 208 is not directly related to the first input 206 or to the second input 210, which is why it is stored in a different space within the local memory 200. While there is no functional requirement to write the output 208 into the local memory 200 concurrently with reading the first input 206 and the second input 210, performing these operations in parallel improves the processing speed of the computing environment 100.

In cases where the first input 206, the output 208 and the second input 210 have different sizes, the phases of FIGS. 4B to 4E may still be applicable, but may be executed in a different order, in a different total number of cycles.

Any other logical order of execution of the number of the various phases may be contemplated. Many variants of the sequence may be mathematically equivalent, so the actual implementation of the sequence may be chosen based on hardware capability considerations or based on ease of implementation of the sequence. Other variations may be contemplated, as long as these variations do not cause to concurrently read in distinct memory banks of a same bank group, or to concurrently read and write in a same memory bank.

Figure 5:
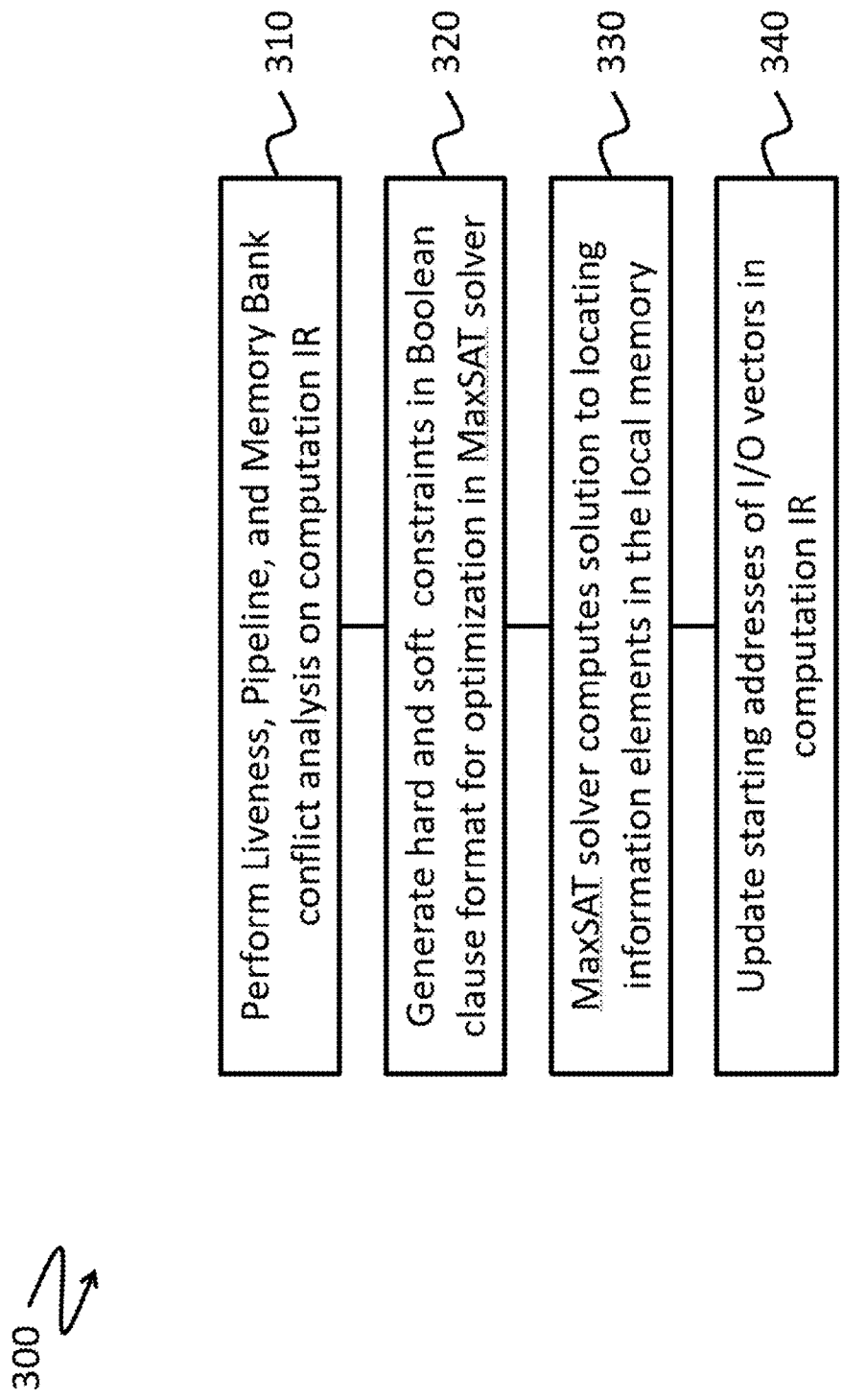
FIG. 5 is a sequence diagram showing operations integrated in a tensor memory layout optimization module for the local memory according to an embodiment of the present disclosure.

The following paragraphs will now present a technique that may be used to select a memory allocation, in the local memory 200, in view of alleviating the potential for memory bank conflicts and/or pipeline conflicts. In an embodiment, these impacts may be alleviated by expressing hard constraints and soft constraints for the allocation of data in the local memory 200 into Boolean clauses in conjunctive normal form. The hard constraints and the soft constraints may then be resolved using a weighted maximum satisfiability problem. FIG. 5 is a sequence diagram showing operations integrated in a tensor memory layout optimization module for the local memory according to an embodiment of the present disclosure. The tensor memory layout optimization module is shown on a later Figure. On FIG. 5, a sequence 300 comprises a plurality of operations, some of which may be executed in variable order, some of the operations possibly being executed concurrently, some of the operations being optional. At operation 310, the tensor memory layout optimization module performs one or more of a liveness analysis, a pipeline conflict analysis and a memory bank conflict analysis on an intermediate representation (IR) of a computer program.

In this context, the liveness analysis is performed to evaluate a liveness of each I/O vector and detect potential overlaps between I/O vectors. An I/O vector is alive starting from its creating in a syntax node until it is eliminated at another syntax node when it is last used. The range between these two syntax nodes is its liveness.

Two I/O vectors with overlapped memory ranges may not be allocated if their liveness is overlapped. The context of "liveness" may be illustrated considering for example the following 3 steps:

B=1.0 (step S1);
C=A+B (step S2);
C=C+1.0 (step S3).

In these 3 steps, the liveness of B is [S1, S2] and the liveness of C is [S2, S3]. B and C have conterminal livenesses at step S2. As long as other rules are satisfied (same I/O vector sizes, appropriate instruction types, other hardware-based rules), B and C may reuse the same area in the local memory 100. This hard constraint may be used as an exception to a rule defined in relation (2) (hereinbelow) to reduce the memory to be allocated to the various I/O vectors.

In this context, the pipeline conflict analysis enables a higher performance of the computing environment 100 by optimizing the possibility of executing different operations in parallel in different pipeline units. If two I/O buffers are allocated to some (or overlapped) memory range, their reading and writing operations will be executed successively so to avoid data conflicts, this successive execution being controlled using additional synchronization. The pipeline conflict analysis searches for each two operations that may potentially be parallelizable. For two such operations, a hard constraint is defined that attempts to not allocate reading or writing I/O buffers in overlapping memory ranges.

Analysis of the IR of the computer program provides information about variables that belong to a same operation, as inputs or as outputs; this information is useful in identifying potential read-read conflicts and read-write conflicts and in identifying variables that may cause pipeline conflicts.

Hard and soft constraints for memory layout optimization are generated in Boolean clause format at operation 320. To this end, the tensor memory layout optimization module may use a maximum satisfiability (MaxSAT) solver. A non-limiting example of a suitable MaxSAT solver that may be used to this purpose is available on the web site of the Open-WBO at http://sat.inesc-id.pt/open-wbo/. Given a conjunctive normal form formula with non-negative costs assigned to each Boolean clause, as is the case in the present technology, the MaxSAT solver allows finding truth values for its variables that maximize the combined cost of the satisfied Boolean clauses. In more details, variables that are true if a vector i can begin at address j are defined. Boolean clauses (or formulae) that involve these variables are generated in conjunctive normal form equivalent to the tensor memory layout optimization hard and soft constraints. Use of the MaxSAT solver allows reducing the tensor memory layout allocation problem to a maximum satisfiability problem. While it is not a priori known which of these variables are true or false, the MaxSAT solver identifies which variables are true or false based on the hard and soft constraints. The MaxSAT solver provides various true or false values that satisfy the hard constraints, as well as at least some of the soft constraints, with highest possible total cost. A non-limiting example implementation of the operation 320 is described in more details below.

At operation 330, the MaxSAT solver may compute a solution to the problem of locating information elements in the local memory 200. The results provided by the MaxSAT solver may be interpreted as addresses at which the I/O vectors may be allocated in the local memory 200. Then, at operation 340, the tensor memory layout optimization module updates the starting address of input/output (I/O) vectors in computation IR for each information element to be read using the read port 130 or stored using the write port 140 in the local memory 200.

The MaxSAT solver may optimize the task of allocating memory within the memory banks of the local memory 200 as follows.

A Boolean variable $X_{i,j}$, in which i designates an I/O vector and j designates its starting address, is declared. It is stipulated, by definition, that $X_{i,j}=1$ when I/O vector i starts at address j. Boolean clauses expressed in the following relations define hard and soft constraints that are applied by the MaxSAT solver to optimize the memory allocation task.

Considering the last possible starting address $M_i$ introduced hereinabove, the following relation (1) defines a hard clause used by the MaxSAT solver:

$$(X_{i,0} \vee \ldots \vee X_{i,M_i}, \infty) \tag{1}$$

Relation (1) uses an infinite cost ($\infty$) in order to ensure that each I/O vector i starts at a respective starting address.

The following relation (2) defines another hard clause to be used by the MaxSAT solver:

$$(\neg X_{i,j} \vee \neg X_{k,l}, \infty) \tag{2}$$

Relation (2) stipulates that an infinite cost ($\infty$) is applied to prevent any physical overlap between I/O vectors. Relation (2) applies for all j and l to prevent physical overlaps that would occur if I/O vector i started at address 256·j and I/O vector k started at address 256·l. An exception may be defined for I/O vectors that can be reused by the same operation (for example when adding A+B to obtain C, and storing C in the same memory space as B) and having equal starting addresses, i.e. j=i.

Relation (3) introduces a soft clause in which a cost model aimed at minimizing read-read conflicts within the local memory 200:

$$(\neg X_{i,j} \vee \neg X_{k,l} RR_{ik}) \text{ if } j=l(\bmod 2) \qquad (3)$$

In relation (3), $RR_{ik}$ is a cost value attributed to a read-read conflict between I/O vectors i and k. This cost value being less than infinite, such read-read conflicts may be acceptable, as the intent is to mitigate the impacts of such conflicts when they cannot be entirely avoided.

For read-write conflicts, relation (4) introduces another soft clause similar to relation (3), except that it applies to different address pairs:

$$(\neg X_{i,j} \vee \neg X_{k,l} RW_{ik}) \text{ if } j \text{ and } l \text{ are in the same tier} \qquad (4)$$

In relation (4), $RW_{ik}$ is a cost value attributed to a read-write conflict between I/O vectors i and k.

Relation (5) describes a soft clause in which a cost value is applied to pipeline conflicts:

$$(\neg X_{i,j} \vee \neg X_{k,l} PC_{ik}) \qquad (5)$$

In relation (5), $PC_{ik}$ is a cost value attributed to pipeline conflicts for all I/O vectors i and k that have pipeline conflict, and j and l being such that a physical overlap would occur if I/O vector i started at address 256·j and I/O vector k started at address 256·l. In a non-limiting embodiment, the cost value attributed to pipeline conflicts may be greater than the total costs of all potential memory bank conflicts in order to prioritize mitigation of pipeline conflicts.

Applying the soft constraints expressed in relations (1) and (2) and the hard constraints expressed in relations (3) to (5), the size of the model generated by MaxSAT model could be very large. The need to minimize the potential for read-read conflict might translate into the creation of a number of clauses equal to the square of the total number of potential starting addresses. This could affect a compilation time of the computing environment 100, because the number of clauses for most types of clauses would be quadratic both in terms of a number of I/O vectors an in terms of a number of available starting addresses.

In an embodiment, a size of the model generated by the MaxSAT solver may be significantly reduced by introducing auxiliary variables. For example and without limitation, to mitigate read-read conflicts, new variables may be created for I/O vectors starting at addresses 256·i, in which i has an odd value for each I/O vector. In this manner, there is no need to generate a clause for each possible pair of addresses. It is sufficient to have 2 clauses for each pair of I/O vectors with potential read-read conflicts to ensure they are in different bank groups.

In the same or another embodiment, to mitigate read-write conflicts, additional new tier variables may be created for I/O vectors. The tier variables are true when both the input data and the output data have any data in a same 64-Kbyte tier (i.e. the memory banks B00 to B15, or B16 to B31, or B32 to B47, or B48 to B63) of the local memory 200.

Still in the same or another embodiment, to mitigate pipeline conflicts and live range intersects, new "cover" variables may be added for I/O vectors having any data at address j. Instead of checking all pairs of starting addresses that might cause two I/O vectors to overlap, it suffices to check that two I/O vectors do not share at least in part the same address range. In this manner, a number of overlap clauses becomes linear in number of starting addresses instead of being quadratic. For pipeline conflicts, other overlap variables are true if I/O vector i overlaps at least in part I/O vector j. Overlap variables may be defined using cover variables. Overlap variables are useful to optimize for number of overlapping pairs of I/O vectors, instead of number of individual addresses that overlap.

Still in the same or another embodiment, to mitigate the impacts of in memory space reuse, new Boolean variables are introduced for two I/O vectors starting at the same address. Additional hard clauses may be created in order to define auxiliary variables. In the present examples, the largest group of clauses is the group defining cover variables. A number of clauses in this group for a problem with n I/O vectors of size buf_sz, and nAddr of available starting addresses would be according to relation (6):

$$n*(n\text{Addr}-\text{buf\_sz})*\text{buf\_sz} \qquad (6)$$

Relation (6) may be used to estimate the problem size and the amount of time that the MaxSAT solver may need to perform the memory allocation task.

Figure 6:
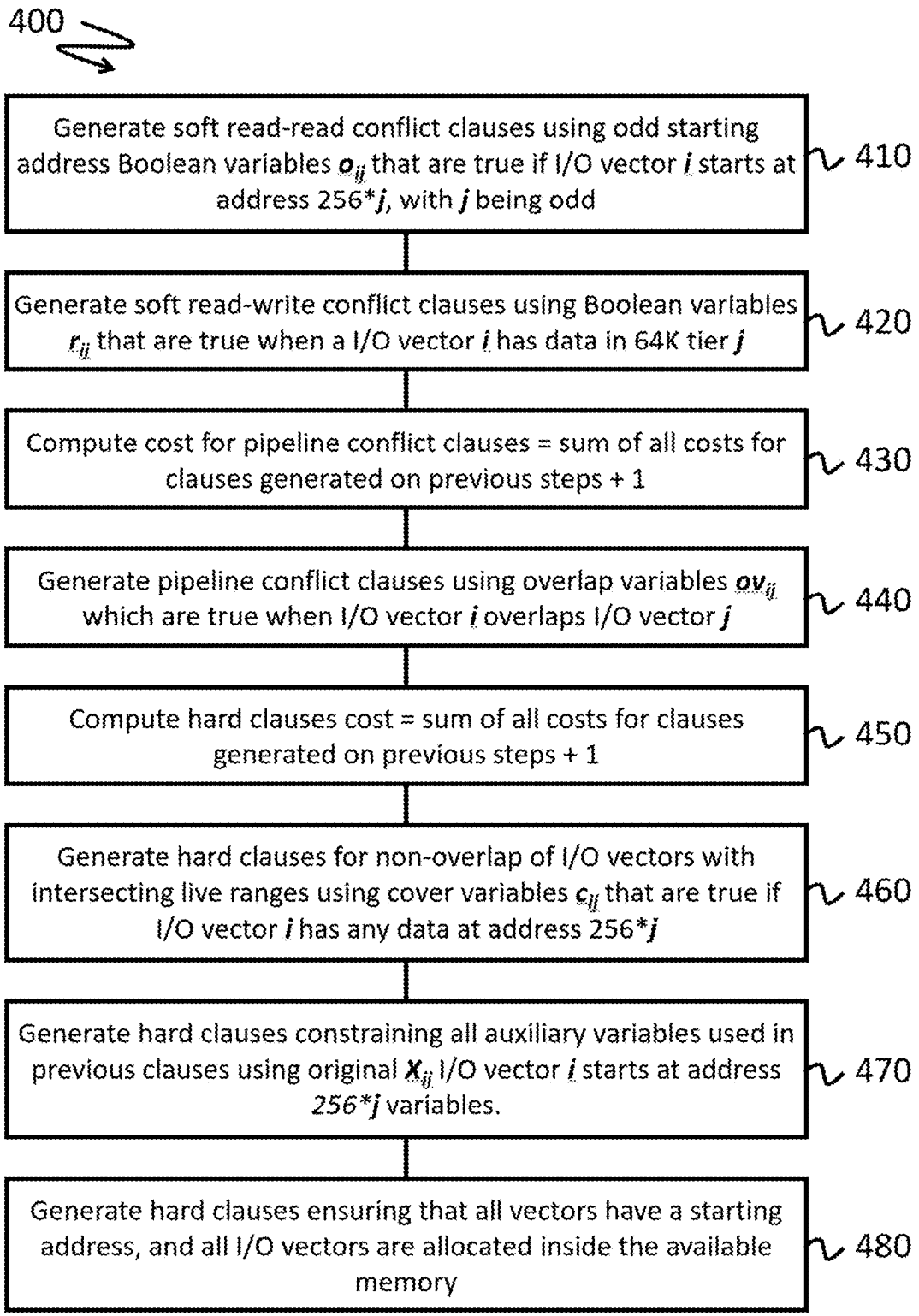
FIG. 6 is a sequence diagram showing details of the generation, in Boolean clause format, of tensor memory layout optimization soft constraints and hard constraints according to an embodiment of the present disclosure.

FIG. 6 is a sequence diagram showing details of the generation, in Boolean clause format, of tensor memory layout optimization soft constraints and hard constraints according to an embodiment of the present disclosure. On FIG. 6, a sequence 400 comprises a plurality of operations, some of which may be executed in variable order, some of the operations possibly being executed concurrently, some of the operations being optional. The sequence 400 is a non-limiting example implementation of the operation 320 introduced in the foregoing description of FIG. 5. The sequence 400 includes operations 410 to 480:

Operation 410: soft read-read conflict clauses are generated using starting address Boolean variables $o_{ij}$, these Boolean variables being true when I/O vector i starts at address 256·j, in which j is an odd value.

Operation 420: soft read-write conflict clauses are generated using Boolean tier variables $r_{ij}$, these Boolean tier variables being true when an I/O vector i has data in a 64K tier j.

Operation 430: a cost for pipeline conflict clauses is calculated as a sum of 1 plus the costs for all clauses in operations 410 and 420. For example and without limitation, the cost for a read-read conflict or for read-write conflict may be equal to the largest buffer size divided by 256.

Operation 440: pipeline conflict clauses are generated using Boolean overlap variables $ov_{ij}$, these Boolean variables being true when I/O vector i overlaps I/O vector j.

Operation 450: a cost of hard clauses is calculated as a sum of 1 plus the cost for all clauses generated in operations 410 to 440. The cost calculated in this operation is expected to be fairly high and is intended to approximate the infinite cost (∞) of relations (1) and (2).

Operation 460: hard clauses for non-overlap of I/O vectors with intersecting live ranges are generated using Boolean cover variables $C_{ij}$, these Boolean variables being true when I/O vector i has any data at address 256·j.

Operation 470: hard clauses constraining all auxiliary variables used in previous clauses are generated using the original $X_{i,j}$ I/O vector, in which i starts at address 256·j.

Operation 480: hard clauses are generated while ensuring that all I/O vectors have a starting address and that all I/O vectors are allocated in the local memory 200.

The present technology may be applied in a kernel compiler of the computing environment 100. A kernel compiler pass determines starting addresses for the I/O vectors based on known information about tasks to be executed on the data contained in the local memory 200, about input vectors, output vectors, live ranges, and potential pipeline conflicts. The compiler assigns starting addresses to the I/O vectors in the local memory 200, or in local memories having other configurations, for example on various types of on-chip memory.

Figure 7:
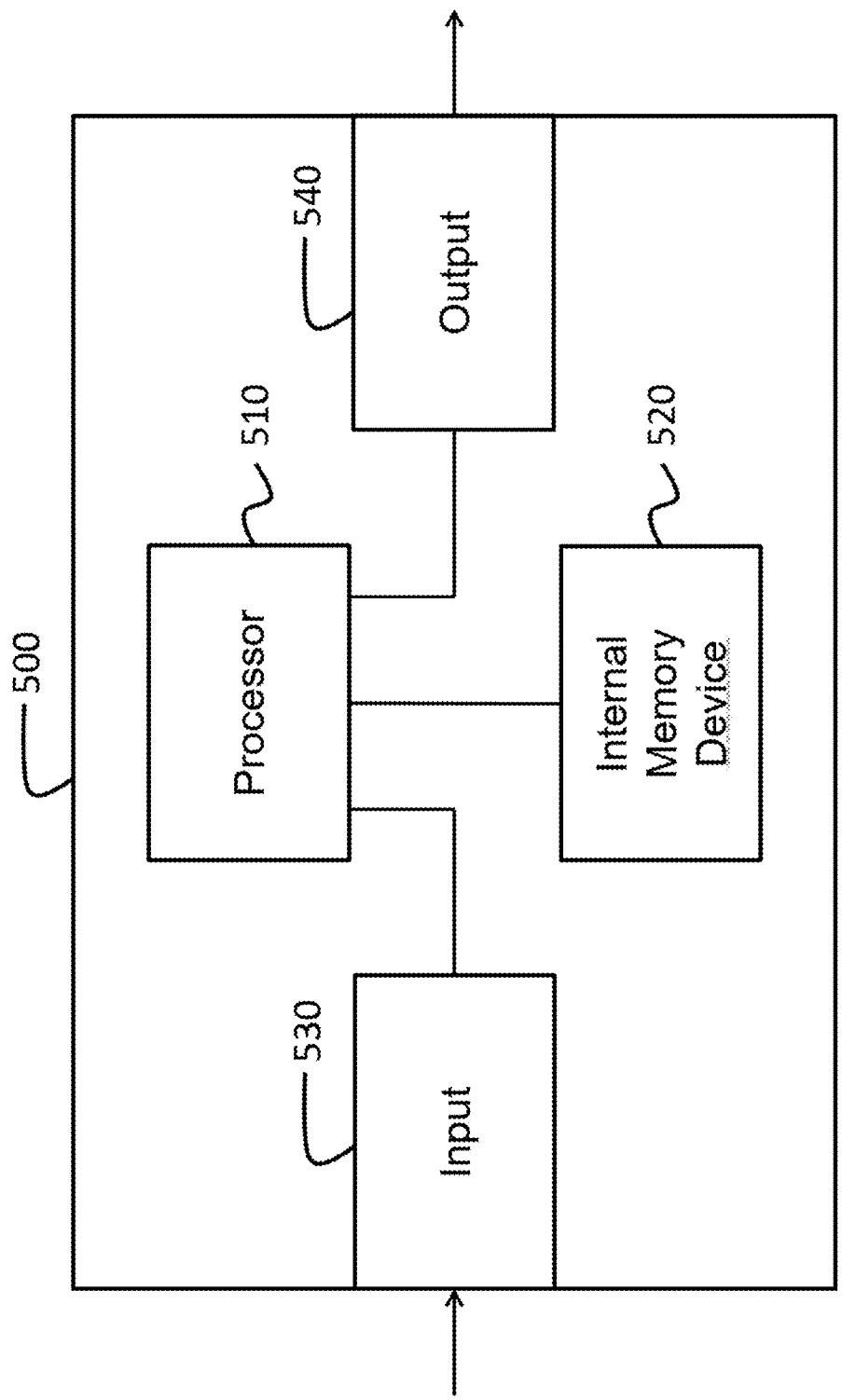
FIG. 7 is a block diagram of a tensor memory layout optimization module according to an embodiment of the present disclosure.

FIG. 7 is a block diagram of a tensor memory layout optimization module according to an embodiment of the present disclosure. A tensor memory layout optimization module 500 comprises a processor or a plurality of cooperating processors (represented as a processor 510 for simplicity), an internal memory device or a plurality of internal memory devices (represented as a single internal memory device 520 for simplicity), an input device or a plurality of input devices (represented as an input device 530 for simplicity), and an output device or a plurality of output devices (represented as an output device 540 for simplicity). A combined input/output device may be present instead of separate input and output devices. The processor 510 is operatively connected to the internal memory device 520, to the input device 530 and to the output device 540. The internal memory device 520 may comprise a non-transitory computer-readable medium for storing instructions that are executable by the processor 510.

The input device 530 may receive the information about the structure of the local memory 200 and about operations (i.e. tasks) to be executed on the data contained in the local memory 200, about input vectors, output vectors, live ranges, and potential pipeline conflicts. This information is provided by the input device 530 to the processor 510, which may store the information in the internal memory device 520. The processor 510 may implement a MaxSAT solver, for example a solver obtained from an open source library. Using the MaxSAT solver, the processor 510 may execute the various operations of the sequences 300 and/or 400 to assign the starting addresses of the I/O vectors in view of the configuration of the input port 130 and of the output port 140, as well as in view of the configuration of the local memory 200. The processor 510 then causes the output device 540 to provide these starting addresses to the computing environment 100, for example to the processing unit 120 and/or to the global memory. Data useful for execution of a task may then be copied from the global memory 110 to the local memory 200 according to the starting addresses defined by the tensor memory layout optimization module 500.

It will be appreciated that the sequences 300 and 400 may also be performed by computer programs, which may exist in a variety of forms both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

A performance of the present technology has been evaluated in both a simulation environment and in an actual hardware implementation. Simulation results are presented in FIGS. 8 and 9, and hardware-based results are presented in FIG. 10.

The simulation environment includes a test suite containing a large number of common machine learning operations with frequently used shapes. In the context of the present technology, the shapes may correspond to array/vector dimensions in typical deep learning operations. These arrays or vectors are broken up into smaller pieces in order to be processed on the computing environment 100. These pieces are seen as simple unidimensional arrays when performing the tensor memory layout optimization. These original shapes were tested to show how the present technology behaves for real life applications.

The tests were run in a simulator, in which the MaxSAT solver available from the Open-WBO the web site (at http://sat.inesc-id.pt/open-wbo/) was implemented, both without and then with the present tensor memory layout optimization technique. The simulator provided detailed information on execution of kernels, including runtime, memory bank conflicts, pipeline loads, etc. Test cases having more than 50 read-read and read-write memory bank conflicts when used without the present technology, were compared with results obtained using the present memory tensor layout optimization technique. The simulator applied a timeout at 4 seconds, following which a non-optimal solution was provided. An overall timeout of 100 seconds was applied. A limit on the number of I/O vectors was set to 1000, and a limit on the number of clauses was set to 15,000,000. Eventual write-write conflicts were not part of the simulation. A total of 1141 test cases were run, among which 171 test cases had more than 50 read-read and read-write memory bank conflicts.

Figure 8:
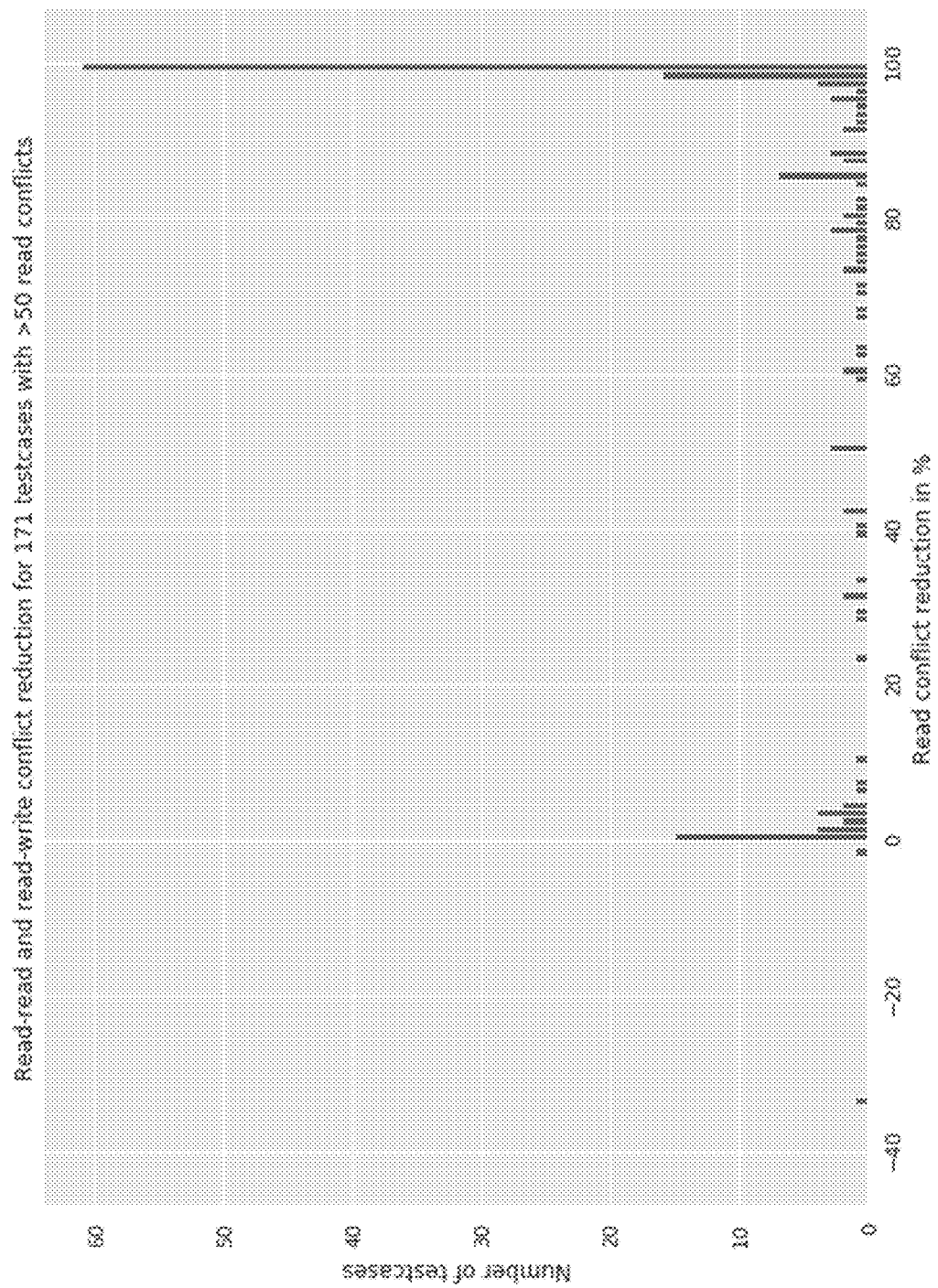
FIG. 8 shows a histogram presenting a relative reduction in memory bank conflicts for simulated test cases.

FIG. 8 shows a histogram presenting a relative reduction in memory bank conflicts for simulated test cases. The histogram includes information for the 171 test cases having more than 50 read-read and read-write memory bank conflicts in simulation runs made without the present technology. A vertical axis shows a number of test cases distributed over a horizontal axis that provides percentage variations (improvements or worsening) of read conflicts. A vast majority of test cases showed an important reduction of conflicts when run with the present tensor memory layout optimization technique.

Figure 9:
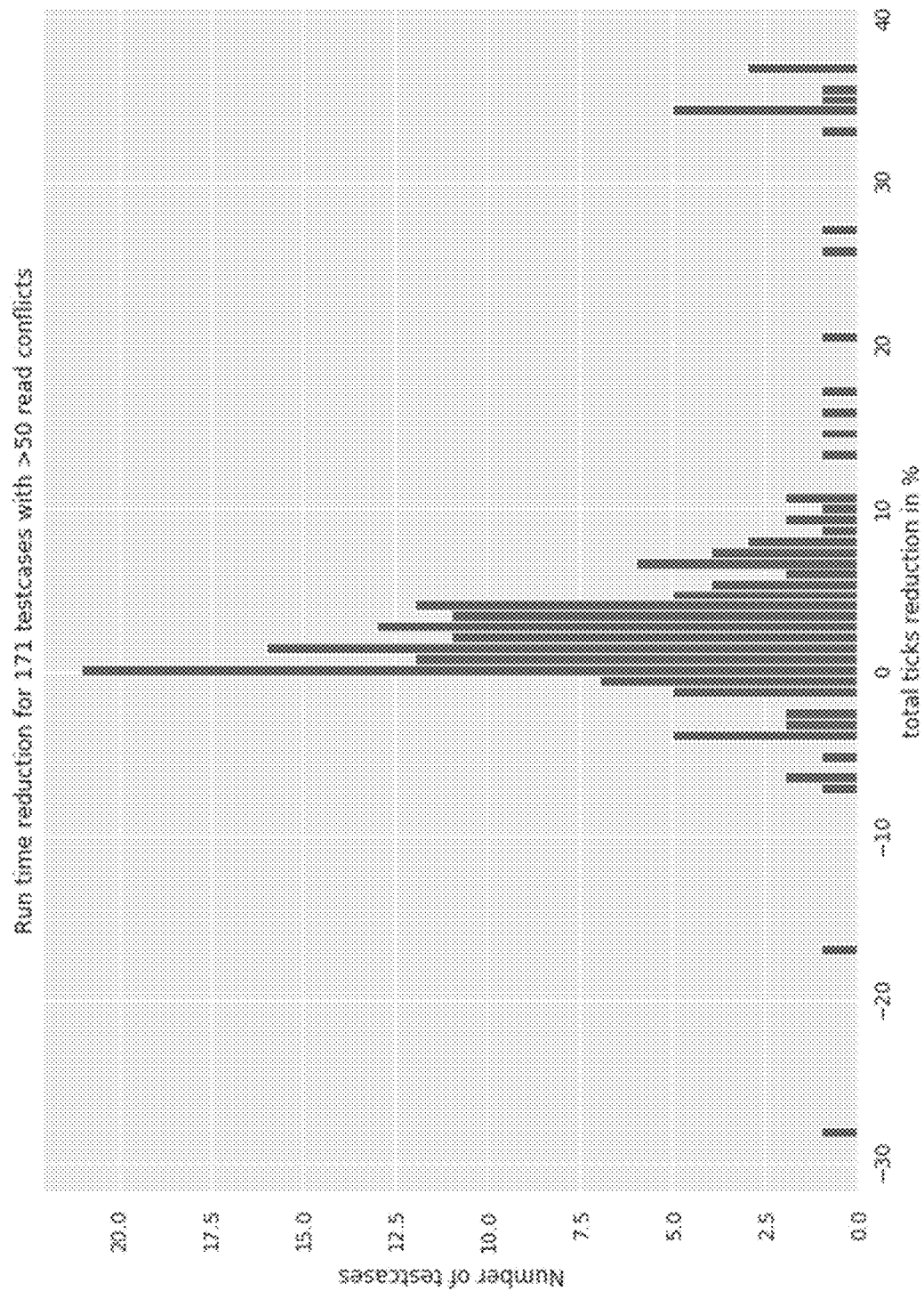
FIG. 9 shows a histogram presenting a relative run time reduction for the simulated test cases.

A very small number of new conflicts were generated, as evidenced by a few bars shown with negative percentages on the horizontal axis. Due to the heavy cost of pipeline conflicts, the simulation gave higher priority to reducing pipeline conflicts before reducing memory bank conflicts. As a result, the number of memory bank conflicts increased in few test cases. Regardless, the overall execution was faster due to improved instruction level parallelism. Indeed, FIG. 9 shows a histogram presenting a relative run time reduction for the simulated test cases. The histogram includes information about the same 171 test cases). A vertical axis shows a number of test cases distributed over a horizontal axis that provides percentage variations (improvements or worsening) in the number of cycles (or "ticks") used by the hardware to execute its tasks. In FIG. 9, positive values represent faster execution of some test cases and negative values correspond to slower test case execution. It was found that the reduction in memory bank conflicts corresponds a relatively small improvement in runtime (up to 8%), whereas reduction in pipeline conflicts may yield 30-40% runtime reduction.

Increase in runtime for some tests may occur for 2 reasons. Firstly, a kernel may contain a very large number of scalar operations, for example operations with indices of tensor elements, as using larger starting addresses of vectors increases number of instructions needed to process these operations. This could be the case for instructions that only copy 16 bits at a time. Secondly, code size may slightly increase because of increases in starting addresses, which require more operations to process, with an increased potential for cache misses that may make a difference if the operation's runtime is very short to begin with.

Regardless, accounting for all performance variations and despite some local regressions, the runtime of the 171 test cases was reduced by 4.7% on average when using the tensor memory layout optimization technique.

Figure 10:
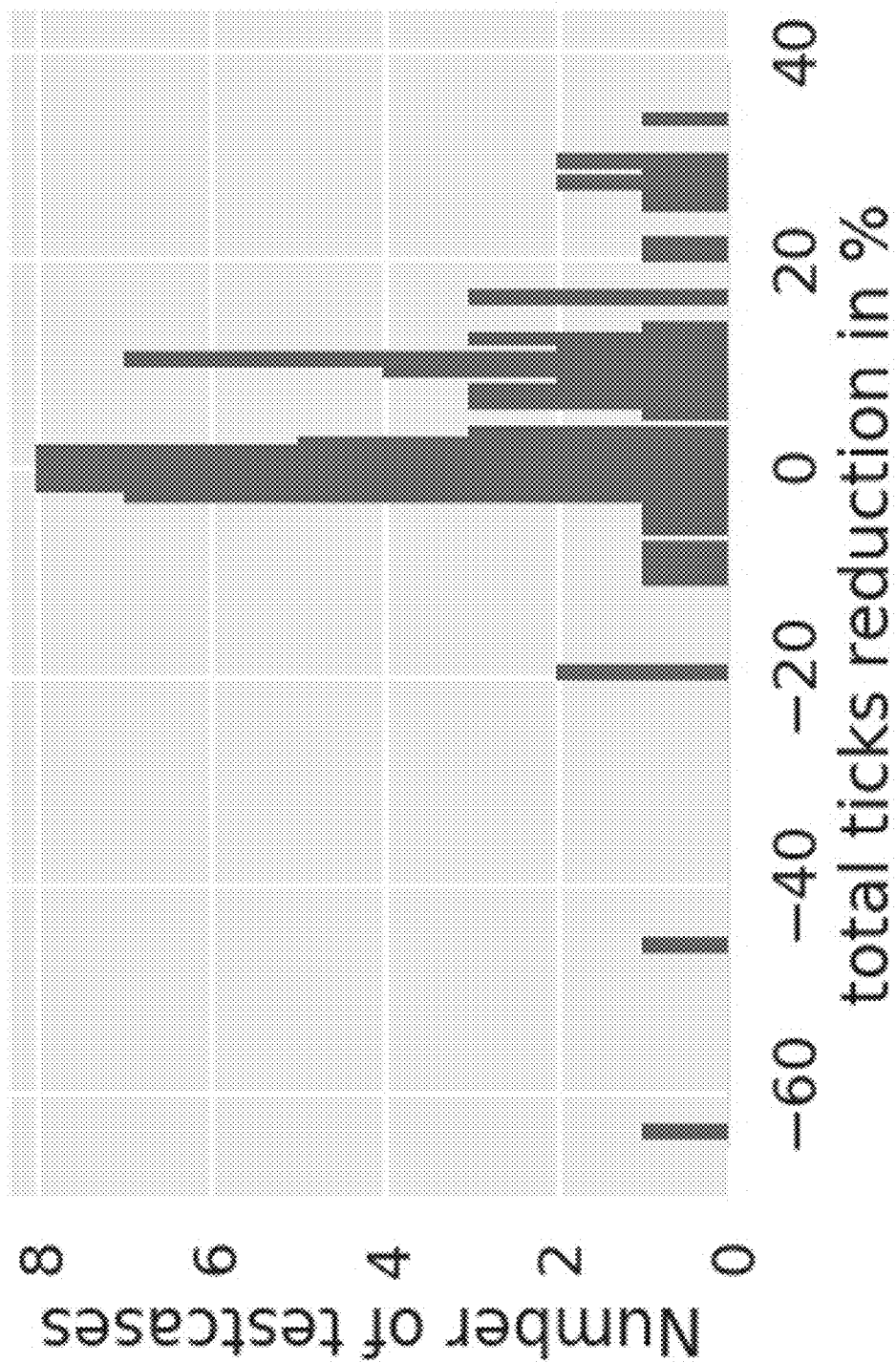
FIG. 10 shows a histogram presenting a relative run time reduction for a number of hardware-based test cases.

Test cases where run on a hardware implementation, without and then with the present tensor memory layout optimization technique. Of these, 97 test cases had more than 50 read-read and read-write memory bank conflicts without the present tensor memory layout optimization technique. FIG. 10 shows a histogram presenting a relative run time reduction for a number of hardware-based test cases. The histogram of FIG. 10 is similar in nature and format to the histogram of FIG. 9. As in the case of the simulated tests, the test executed on the hardware implementation show similar results. While some tests are slowed down, as evidenced by a few bars shown with negative percentages on the horizontal axis, the total performance of the collection of 97 test cases reveals a 4.4% runtime reduction.

It is to be understood that the operations and functionality of the described tensor memory layout optimization module 500, its constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for optimizing a layout of a tensor memory, comprising:
    defining at least one hard constraint for allocating a plurality of input/output (I/O) vectors for reading input data or writing output data in the tensor memory, the tensor memory storing data for execution of a task;
    applying the at least one hard constraint to determine one or more potential conflicts between the plurality of I/O vectors;
    applying the at least one hard constraint in a maximum satisfiability (MaxSAT) solver to determine locations of the input data and of the output data in the tensor memory; and
    updating starting addresses, in the tensor memory, of the input data to be read and of the output data to be written by each of the plurality of I/O vectors.

2. The method of claim 1, further comprising:
    generating one or more soft constraints aimed at mitigating the one or more potential conflicts between the plurality of I/O vectors;
    wherein the one or more soft constraints is also applied in the MaxSAT solver to determine locations of the input data and of the output data in the tensor memory.

3. The method of claim 2, wherein the tensor memory is a local memory, the method further comprising:
    transferring the data from a global memory to the local memory for processing of the data by a processing unit executing the task; and
    concurrently reading, by the processing unit, first data from the local memory using a first one of the I/O vectors, reading, by the processing unit, second data from the local memory using a second one of the I/O vectors, and writing, by the processing unit, third data into the local memory using a third one of the I/O vectors, the reading of the first and second data and the writing of the third data being made while complying to the at least one hard constraint.

4. The method of claim 3, wherein:
    the local memory comprises a plurality of tiers, each tier comprising a plurality of memory banks;
    bank groups contain a corresponding memory bank of each of the plurality of tiers;
    a part of the first data is written in one or more first memory banks;
    a part of the second data is written in one or more second memory banks;
    a part of the third data is written in one or more third memory banks;
    there is no intersection between the first, second and third memory banks; and
    the one or more first memory banks and the one of more second memory banks are not part of the same bank groups.

5. The method of claim 4, further comprising performing at least one of a liveness analysis, a pipeline analysis and a memory bank conflict analysis on the local memory before generating the one or more soft constraints and the at least one hard constraint.

6. The method of claim 4, wherein the at least one hard constraint is selected from (i) preventing simultaneous reading and writing in a same memory bank, (ii) preventing simultaneous reading of more than one input in the same bank group, (iii) starting addresses of input and output data are integer multiples of 0.5·W, wherein W is a tier width, (iv) between two distinct inputs to be concurrently read from the local memory, a first input has a starting address being an even-integer multiple of 0.5·W and a second input has a starting address being an odd-integer multiple of 0.5·W, and (v) a combination thereof.

7. The method of claim 6, wherein the one or more soft constraints and the at least one hard constraint are applied to the MaxSAT solver in Boolean clause format.

8. The method of claim 7, wherein generating the one or more soft constraints comprises:
    a) generating soft read-read conflict clauses using starting address Boolean variables, the starting address Boolean variables being true when an I/O vector i starts at an address 0.5·W·j, in which j is an odd value; and
    b) generating soft read-write conflict clauses using read-write Boolean tier variables, the read-write Boolean tier variables being true when the I/O vector i used for a read operation is in a same tier as an I/O vector j used for a write operation.

9. The method of claim 8, wherein generating the one or more soft constraints further comprises:
   c) calculating a cost for a pipeline conflict as a sum of 1 plus costs for all clauses calculated in a) and b); and
   d) generating pipeline conflict clauses using Boolean overlap variables, the Boolean overlap variables being true when the I/O vector i overlaps then I/O vector j.

10. The method of claim 9, wherein defining the at least one hard constraint comprises:
   e) calculating a cost of hard clauses as a sum of 1 plus the costs for all generated in a), b), c) and d);
   f) generating hard clauses for non-overlap of I/O vectors with intersecting live ranges using Boolean cover variables, the Boolean cover variables being true when an I/O vector i has any data at address $0.5 \cdot W \cdot j$;
   g) generating hard clauses constraining all Boolean variables used in a), b), c), d) e) and f) using an original I/O vector i,j, in which i starts at address $0.5 \cdot W \cdot j$; and
   h) generating hard clauses while ensuring that all I/O vectors have a starting address and that all I/O vectors are allocated in the local memory.

11. The method of claim 8, wherein the MaxSAT solver determines the locations of the input and the output data in the local memory by application of the Boolean clauses.

12. The method of claim 8, wherein:
   the local memory contains 64 memory banks distributed among 4 tiers and 16 bank groups;
   each memory bank contains 128 rows that each contains 32 bytes, whereby the tier width W is equal to 512 bytes.

13. A tensor memory layout optimization module, comprising:
   an input device adapted to receive information about a tensor memory and about a task to be executed on data contained in the tensor memory;
   an output device adapted to output starting addresses of data elements contained in the tensor memory;
   a processor operatively connected to the input device and to the output device; and
   a non-transitory computer-readable medium for storing instructions that are executable by the processor to implement the method of claim 1.

* * * * *